(12) United States Patent
Whelan et al.

(10) Patent No.: US 10,128,570 B2
(45) Date of Patent: Nov. 13, 2018

(54) SYSTEM AND METHOD FOR WIRELESS COMMUNICATIONS USING AN ADAPTABLE DIAMOND PHASED ARRAY ANTENNA SYSTEM

(71) Applicant: The Boeing Company, Chicago, IL (US)

(72) Inventors: David A. Whelan, Newport Coast, CA (US); Ying J. Feria, Manhattan Beach, CA (US); Parthasarathy Ramanujam, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 15/292,294

(22) Filed: Oct. 13, 2016

(65) Prior Publication Data
US 2018/0108986 A1 Apr. 19, 2018

(51) Int. Cl.
| | | |
|---|---|---|
| H01Q 1/36 | (2006.01) | |
| H01Q 3/01 | (2006.01) | |
| H01Q 3/04 | (2006.01) | |
| H04B 7/185 | (2006.01) | |
| H04W 40/22 | (2009.01) | |
| H01Q 1/27 | (2006.01) | |
| H01Q 3/24 | (2006.01) | |
| H01Q 21/06 | (2006.01) | |

(52) U.S. Cl.
CPC .......... *H01Q 3/01* (2013.01); *H01Q 1/27* (2013.01); *H01Q 3/04* (2013.01); *H01Q 3/24* (2013.01); *H01Q 21/065* (2013.01); *H04B 7/1851* (2013.01); *H04W 40/22* (2013.01)

(58) Field of Classification Search
None
See application file for complete search history.

(56) References Cited

U.S. PATENT DOCUMENTS

| | | |
|---|---|---|
| 4,949,092 A | 8/1990 | Crail et al. |
| 5,039,991 A | 8/1991 | Boese et al. |
| 5,791,654 A | 8/1998 | Gaines et al. |
| 6,034,634 A | 3/2000 | Karlsson et al. |
| 6,961,025 B1 | 11/2005 | Chethik et al. |
| 7,337,097 B2 | 2/2008 | Ih |
| 2002/0109630 A1* | 8/2002 | Law .................. G01S 13/95 342/368 |

(Continued)

FOREIGN PATENT DOCUMENTS

| | | |
|---|---|---|
| EP | 1 942 554 | 7/2008 |
| WO | WO 2006/061865 | 6/2006 |

OTHER PUBLICATIONS

European Patent Office, "Extended European Search Report," App. No. 17185822.8 (dated Feb. 13, 2018).

*Primary Examiner* — Trinh Dinh
(74) *Attorney, Agent, or Firm* — Walters & Wasylyna LLC

(57) ABSTRACT

An antenna system includes an array of radiating elements forming a diamond shape. The diamond shape includes a first axis and a second axis. The diamond shape is oriented with the first axis aligned with a reference plane shared by a plurality of airborne communications relay platforms. The diamond shape is reoriented to maintain the first axis aligned with the reference plane in response to a change in position of the reference plane relative to the array.

20 Claims, 17 Drawing Sheets

(56) References Cited

U.S. PATENT DOCUMENTS

| | | | |
|---|---|---|---|
| 2008/0129634 A1* | 6/2008 | Pera | H01Q 9/0435 343/853 |
| 2018/0164441 A1* | 6/2018 | Feria | G01S 19/28 |
| 2018/0166779 A1* | 6/2018 | Feria | H01Q 1/24 |

* cited by examiner

US 10,128,570 B2

SYSTEM AND METHOD FOR WIRELESS COMMUNICATIONS USING AN ADAPTABLE DIAMOND PHASED ARRAY ANTENNA SYSTEM

FIELD

The present disclosure is generally related to wireless communications and, more particularly, to a system and method for wireless communications that utilizes a phased array antenna system having an adaptable diamond shape.

BACKGROUND

Modern wireless communications systems and networks depend heavily on airborne (e.g., orbital or aerial) communications platforms to route communications (e.g., transmit and receive information) between ground-based base stations and user terminals. In such a communications environment, sharing spectrum on a non-interfering basis is required for reliable service.

In the wireless communications direction from the user terminals to the orbital or aerial communications platform, a major factor that determines the feasibility of spectrum sharing is the amplitude (or relative gain) of the side lobes of the radio frequency signals transmitted by the antennas of the user terminals.

Conventional solutions to reduce such side lobe interference are generally not suitable for mobile user terminals. As one example, while reflector antennas reduce side lobe interference, they have a large profile and require complex mechanical beam pointing mechanisms to operate in a mobile environment. As another example, while circular planar arrays have a low profile and allow for electronic beam steering, they generate high amplitude side lobes, which limits the spectral efficiency.

Accordingly, those skilled in the art continue with research and development efforts in the field of reducing side lobe interference in a wireless communications system.

SUMMARY

In one embodiment, the disclosed antenna system includes an array of radiating elements forming a diamond shape. The diamond shape includes a first axis and a second axis. The diamond shape is oriented with the first axis aligned with a reference plane shared by a plurality of airborne communications relay platforms. The diamond shape is reoriented to maintain the first axis aligned with the reference plane in response to a change in position of the reference plane relative to the array.

In another embodiment, the disclosed communications system includes a plurality of airborne communications relay platforms travelling along a path within a shared reference plane, and a mobile user terminal in wireless communication with one of the relay platforms by an antenna system. The antenna system includes an array of radiating elements forming a diamond shape. The diamond shape includes a first axis and a second axis. The diamond shape is oriented with the first axis aligned with the reference plane. The diamond shape is reoriented to maintain the first axis aligned with the reference plane in response to a change in position of at least one of the relay platforms relative to the user terminal.

In yet another embodiment, the disclosed method includes the steps of: (1) configuring an array of radiating elements in a diamond shape, the diamond shape including a first axis and a second axis, (2) orienting the diamond shape to align the first axis with a reference plane shared by a plurality of airborne communications relay platforms, and (3) reorienting the diamond shape to maintain the first axis aligned with the reference plane in response to a change in position of said reference plane relative to the array.

Other embodiments of the disclosed systems and method will become apparent from the following detailed description, the accompanying drawings and the appended claims.

DETAILED DESCRIPTION

Figure 1:
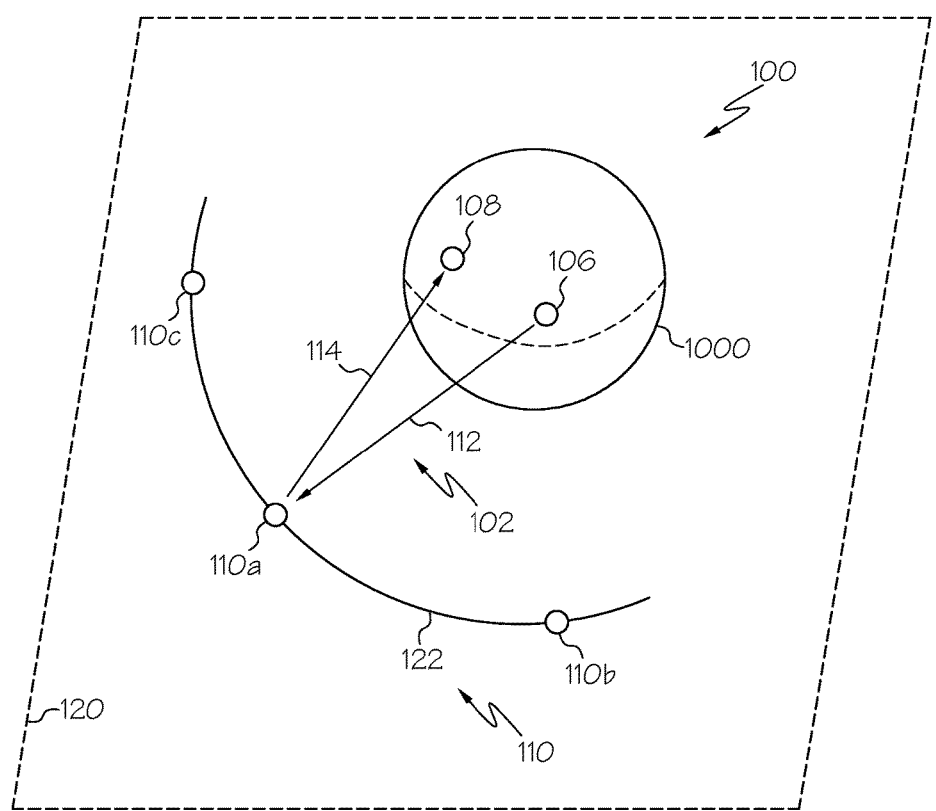
FIG. 1 is a schematic illustration of a field of view of a user terminal in wireless communication with a communications relay platform over a forward link of the disclosed communications system.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Reference herein to "embodiment" means that one or more feature, structure, element, component or characteristic described in connection with the embodiment is included in at least one example or implementation. Thus, the phrase "in one embodiment," "in another embodiment," and similar language throughout the present disclosure may, but do not necessarily, refer to the same embodiment. Further, the subject matter characterizing any one embodiment may, but does not necessarily, include the subject matter characterizing any other embodiment.

Illustrative, non-exhaustive embodiments, which may be, but are not necessarily, claimed, of the subject matter according the present disclosure are provided below.

Figure 2:
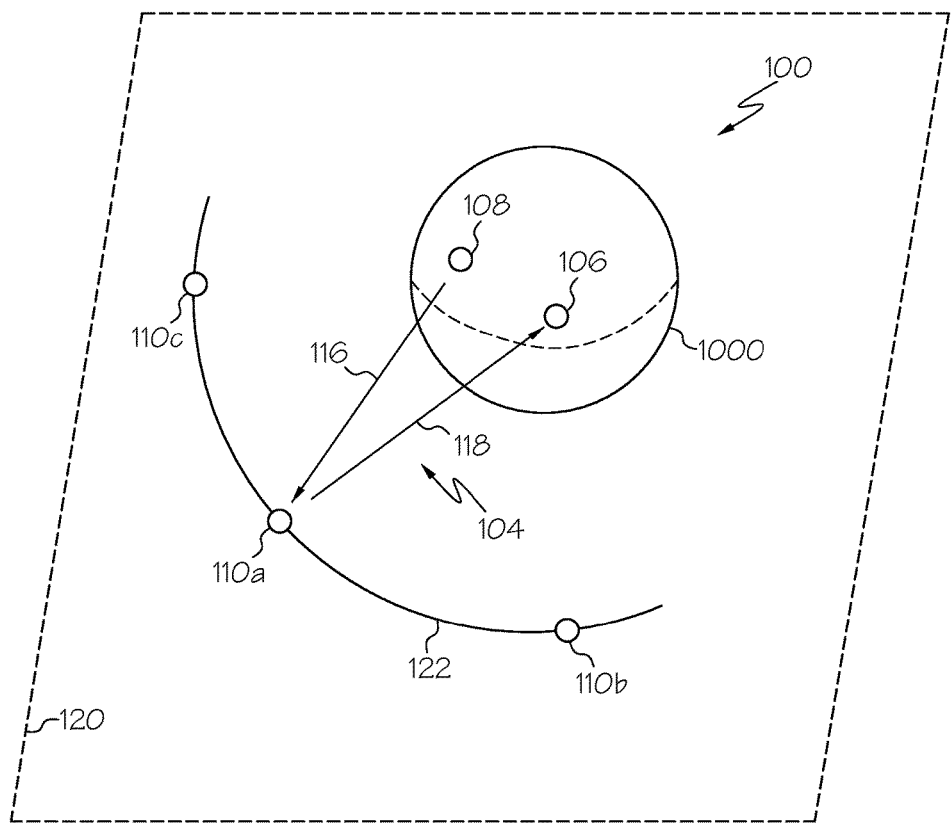
FIG. 2 is a schematic illustration of the field of view of the user terminal in wireless communication with the communications relay platform over a return link of the disclosed communications system.

Referring to FIGS. 1 and 2, one embodiment of a wireless communications system 100 is disclosed. The communications system 100 includes a forward link 102 (FIG. 1) and a return link 104 (FIG. 2). The forward link 102, also referred to as a downlink, is a communications path for the wireless transmission of data (e.g., a data stream) from a base station 106 to a user terminal 108. The return link 104, also referred to as an uplink, is a communications path for the wireless transmission of data from the user terminal 108 to the base station 106. In this manner, the terms downlink and uplink are used in reference to the user terminal 108.

While only one forward link 102 transmitting data from one base station 106 to one user terminal 108 and only one return link 104 transmitting data from one user terminal 108 to one base station 106 are shown by example in the embodiments illustrated in FIGS. 1 and 2, the disclosed communications system 100 may include a plurality of forward links 102 transmitting data from a plurality of base stations 106 to a plurality of user terminals 108 and/or a plurality of return links 104 transmitting data from a plurality of user terminals 108 to a plurality of base stations 106.

In an exemplary embodiment, the forward link 102 transmits data from one or more of the base stations 106 through one or more airborne (e.g., high altitude or orbital) communications relay platforms 110 (generally referred to herein as relay platforms 110) to one or more of the user terminals 108. Similarly, the return link 104 transmits data from one or more of the user terminals 108 through one or more of the relay platforms 110 to one or more of the base stations 106.

Referring to FIG. 1, in one embodiment, the forward link 102 includes one or more base-to-relay (BTR) links 112 (only one of the BTR links 112 is explicitly identified in FIG. 1). The BTR link 112 is a communications path for the wireless transmission of data from the base station 106 to the relay platform 110. In one embodiment, the forward link 102 also includes one or more relay-to-user (RTU) links 114 (only one of the RTU links 114 is explicitly identified in FIG. 1). The RTU link 114 is a communications path for the wireless transmission of data from the relay platform 110 to the user terminal 108.

As one example, one or more of the base stations 106 communicates with one or more of the relay platforms 110 (individually identified as a first relay platform 110a, a second relay platform 110b and a third relay platform 110c) over the BTR link 112. As one example, one or more of the relay platforms 110 (e.g., the first relay platform 110a, the second relay platform 110b and/or the third relay platform 110c, etc.) communicates with one or more of the user terminals 108 over the RTU link 114.

Referring to FIG. 2, conversely, in one embodiment, the return link 104 includes one or more user-to-relay (UTR) links 116 (only one of the UTR links 116 is explicitly identified in FIG. 2). The UTR link 116 is a communications path for the wireless transmission of data from the user terminal 108 to the relay platform 110. In one embodiment, the return link 104 also includes one or more relay-to-base (RTB) links 118 (only one of the RTB links 118 is explicitly identified in FIG. 2). The RTB link 118 is a communications path for the wireless transmission of data from the relay platform 110 to the base station 106.

As one example, one or more of the user terminals 108 communicates with one or more of the relay platforms 110 (e.g., the first relay platform 110a, the second relay platform 110b and/or the third relay platform 110c, etc.) over the UTR link 116. As one example, one or more of the relay platforms 110 (e.g., the first relay platform 110a, the second relay platform 110b and/or the third relay platform 110c, etc.) communicates with one or more of the base stations 106 over the RTB link 118.

FIGS. 1 and 2 illustrate an exemplary field of view of the base station 106 and/or the user terminal 108 when transmitting to and receiving from the relay platform 110. Generally, each one of the plurality of relay platforms 110 is positioned within a reference plane 120 and travels along a path 122 relative to the Earth 1000. The plane 120 is defined as a reference plane that passes through the Earth 1000. The path 122 is defined as a trajectory of the relay platform 110 within the plane 120. Thus, at any given time the position of each of the relay platforms 110 on its associated path 122 shares a common reference plane 120. As one example, the relay platforms 110 travel (e.g., fly or orbit) along the same path 122 within the plane 120. As another example, the relay platforms 110 travel along different paths 122 and share the reference plane 120 defined by the positions of the relay platforms 110. Each one of the plurality of relay platforms 110 is positioned relative to (e.g., is spaced apart from) one another within the plane 120 and/or along the path 122. For example, the second relay platform 110b and the third relay platform 110c may be considered to be adjacent to the first relay platform 110a.

Generally, the communications system 100 comprises a wireless communication system and includes radio frequency (RF) equipment that enables and controls forward and return RF communications between the base station 106, the user terminal 108 and the relay platform 110. For example, the RF equipment is configured to process, generate, transmit and/or receive RF signals in order to communicate data or other information over the forward link 102 and/or the return link 104. In various embodiments of the disclosed communications system 100, the RF equipment may be distributed among, or implemented in full or in part by, the base station 106, the user terminal 108 and/or the relay platform 110.

Referring still to FIGS. 1 and 2, the base station 106 is a ground-based base station, also commonly referred to as a ground station, a gateway or a teleport. A plurality of base stations 106 may be geographically separated (e.g., spaced apart from one another). As general examples, the base station 106 may be one or more of audio, video and/or data service providers. As one example, base station 106 may be an Internet service provider. As other examples, the base station 106 may be a telephone, voice and/or data service provider. As yet other examples, the base station 106 may be a television, video and/or audio broadcaster. In one embodiment, the base station 106 is coupled to or otherwise part of a terrestrial network (not explicitly illustrated). As one specific example, the network includes a telecommunications network, such as the Internet. Thus, in an exemplary embodiment, the base station 106 provides connectivity between the user terminal 108 and the network through the relay platform 110.

Generally, the base station 106 includes a base station-antenna system (not explicitly illustrated) configured to transmit RF signals to one or more of the relay platforms 110 (e.g., over the BTR link 112) (FIG. 1), and receive RF signals from one or more of the relay platforms 110 (e.g., over the RTB link 118) (FIG. 2). While not explicitly illustrated, the base station-antenna system includes one or more base station-antenna, a base station-transmitter, a base station-receiver and a base station-controller. In one example, the base station-antenna system includes a separate transmit antenna (e.g., one or more antenna elements configured to transmit) and receive antenna (e.g., one or more antenna elements configured to receive). In another example, the base station-antenna system includes a combined transmit/receive antenna (e.g., one or more antenna elements configured to transmit and receive).

Figure 3:
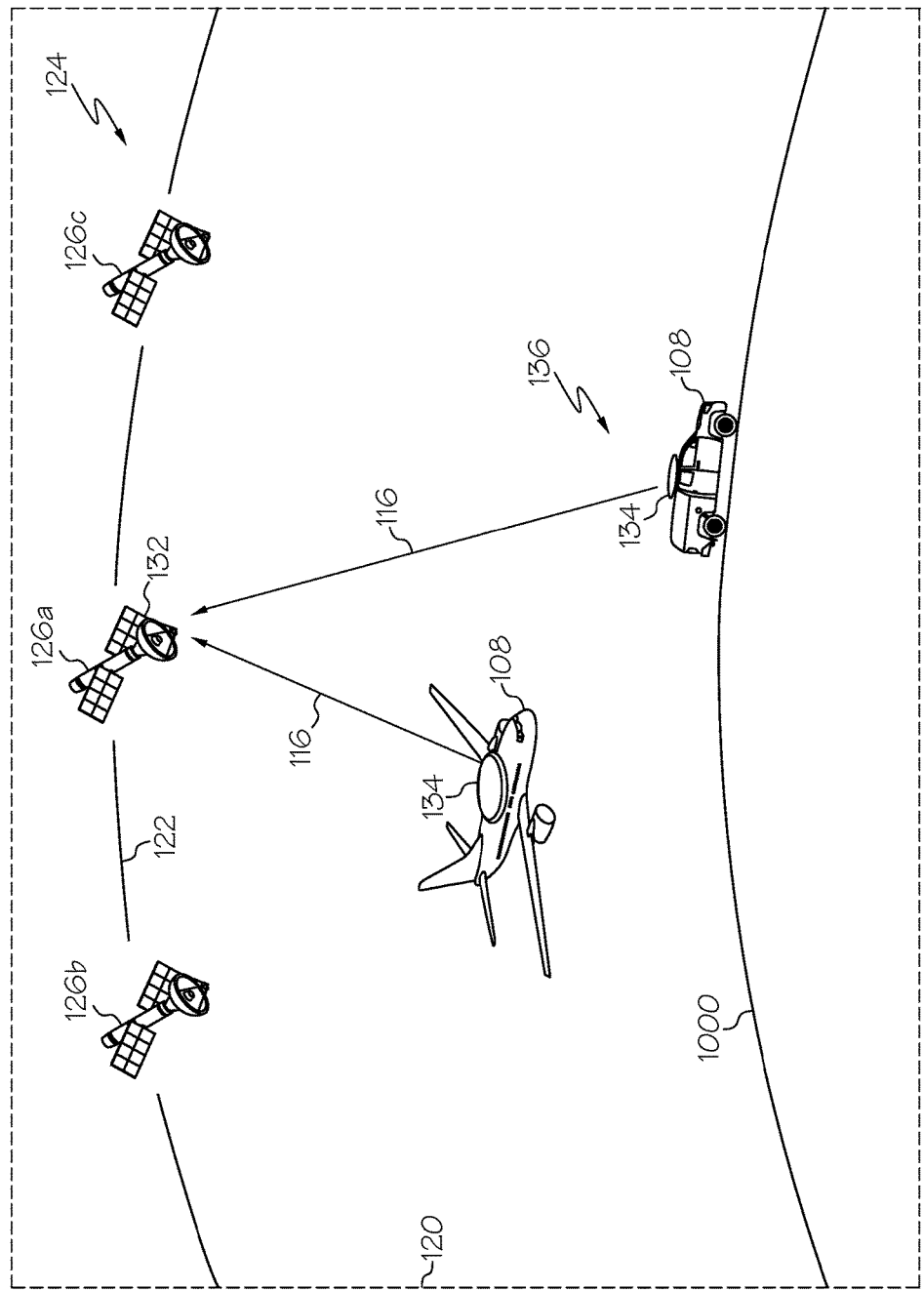
FIG. 3 is a schematic illustration one embodiment of the user-to-relay link between the user terminal and one of a plurality of communications relay platforms.

Referring to FIG. 3, and with reference to FIGS. 1 and 2, in one embodiment, the plurality of relay platforms 110 (FIGS. 1 and 2) is a plurality of orbital relay platforms 110. As one example, the plurality of relay platforms 110 is a constellation 124 of a plurality of (e.g., at least three) satellites 126 (e.g., identified individually as a first satellite 126*a*, a second satellite 126*b* and a third satellite 126*c*). Thus, in this embodiment, the plane 120 is an orbital plane and the path 122 is an orbital path or orbital arc.

Generally, the satellite 126 is any orbital platform that orbits around the Earth 1000 and is configured to transmit and/or receive RF communications to and from the base station 106 (FIGS. 1 and 2) and/or the user terminal 108. As one example, the satellite 126 is in geostationary orbit and, thus, the plane 120 is a geostationary orbital plane and the path 122 is a geostationary orbital arc. As another example, the satellite 126 is in geosynchronous orbit and, thus, the plane 120 is a geosynchronous orbital plane and the path 122 is a geosynchronous orbital arc. As another example, the satellite 126 is in low Earth orbit (LEO) and, thus, the plane 120 is a low Earth orbital plane and the path 122 is a low Earth orbital arc. As another example, the satellite 126 is in high Earth orbit (HEO) and, thus, the plane 120 is a high Earth orbital plane and the path 122 is a high Earth orbital arc. As another example, the satellite 126 is in medium Earth orbit (MEO) and, thus, the plane 120 is a medium Earth orbital plane and the path 122 is a medium Earth orbital arc. As yet another example, the satellite 126 is in Molniya orbit and, thus, the plane 120 is a Molniya orbital plane and the path 122 is a Molniya orbital arc.

As one specific, non-limiting example, the satellite 126 is a high-throughput satellite (HTS). As one non-limiting example, satellite 126 may be configured to transmit and/or receive radio waves covering a microwave frequency range between approximately 1.0 GHz and approximately 90 GHz.

Figure 4:
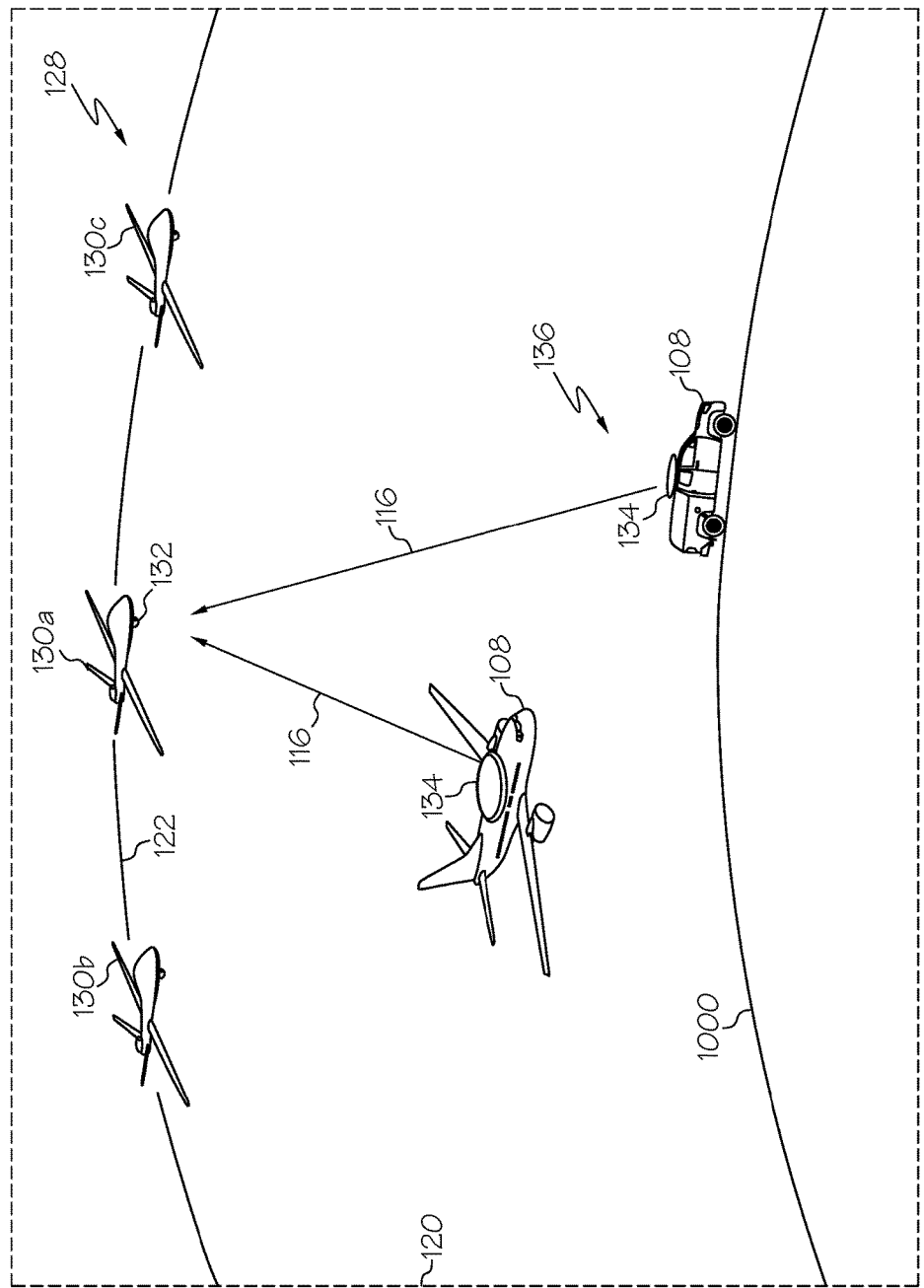
FIG. 4 is a schematic illustration another embodiment of the user-to-relay link between the user terminal and one of a plurality of communications relay platforms.

Referring to FIG. 4, and with reference to FIGS. 1 and 2, in one embodiment, the plurality of relay platforms 110 (FIGS. 1 and 2) is a plurality of high altitude aerial relay platforms 110. As one example, the plurality of relay platforms 110 is a collection 128 of a plurality of (e.g., at least three) aerial vehicles 130 (e.g., identified individually as a first aerial vehicle 130*a*, a second aerial vehicle 130*b* and a third aerial vehicle 130*c*). Thus, in this embodiment, the plane 120 is a flight plane and the path 122 is a flight path.

Generally, the aerial vehicle 130 is any airborne or aerial platform that operates (e.g., flies) at a high altitude over the Earth 1000 and is configured to transmit and/or receive RF communications to and from the base station 106 (FIGS. 1 and 2) and/or the user terminal 108. The aerial vehicle 130 may fly in a predetermined flight path over a given geographic area on Earth 1000, such as over one or more base stations 106 and/or one or more user terminals 108. The aerial vehicle 130 may operate within a minimum altitude and a maximum altitude. As one example, the aerial vehicle 130 operates at an altitude of between approximately 39,000 feet (12 km) and approximately 180,000 feet (55 km) (e.g., the stratosphere). As another example, the aerial vehicle 130 operates at an altitude of between 55,000 feet (16 km) and approximately 164,000 feet (50 km). As another example, the aerial vehicle 130 operates at an altitude of approximately 65,000 feet (20 km). As yet another example, the aerial vehicle 130 operates at an altitude of at least approximately 65,000 feet (20 km).

In one example, the aerial vehicle 130 is an unmanned aerial vehicle (UAV). The aerial vehicle 130 may be capable of flying for long periods of time (e.g., for several months) at the operating altitude. As one specific example, the aerial vehicle 130 is a solar-powered electric UAV. For example, the aerial vehicle 130 may be a high-altitude long endurance (HALE) UAV.

In an exemplary embodiment, each of the relay platforms 110 covers (e.g., provides communications coverage over) a coverage area 136. The coverage area 136 is defined as the area covered by one or more RF beams (e.g., spot beams) generated and transmitted (e.g., projected) by the relay platform 110. The coverage area 136 may be a geographic region, a metropolitan area, a market area and the like. One or more user terminals 108 may be located within the coverage area 136. One or more base stations 106 (FIGS. 1 and 2) may be located within or outside of the coverage area 136.

Referring to FIGS. 3 and 4, and with reference to FIGS. 1 and 2, in one embodiment, each of the relay platforms 110 (e.g., the satellite 126 or the aerial vehicle 130) includes a relay platform-antenna system 132 configured to receive RF signals from one or more of the base stations 106 (e.g., over the BTR link 112) (FIG. 1), transmit RF signals to one or more of the base stations 106 (e.g., over the RTB link 118) (FIG. 2), transmit RF signals to one or more of the user terminals 108 (e.g., over the RTU link 114) (FIG. 1) and/or receive RF signals from one or more of the user terminals 108 (e.g., over the UTR link 116) (FIG. 2). While not explicitly illustrated, the relay platform-antenna system 132 includes one or more relay platform-antenna, a relay platform-transmitter, a relay platform-receiver and a relay platform-controller. In one example, the relay platform-antenna system includes a separate transmit antenna (e.g., one or more antenna elements configured to transmit) and receive antenna (e.g., one or more antenna elements configured to receive). In another example, the relay platform-antenna system includes a combined transmit/receive antenna (e.g., one or more antenna elements configured to transmit and receive).

Referring still to FIGS. 3 and 4, and with reference to FIGS. 1 and 2, the user terminals 108 may be any of a variety of different types of Earth-bound communications devices used by an end user (e.g., an audio, video, or other data communications device). As one example, the user terminal 108 includes small-sized terminals (e.g., handheld terminals, mobile telephones, etc.). As another example, the user terminal 108 includes medium-sized terminals (e.g., portable terminals, vehicular terminals, etc.). As yet another example, the user terminal 108 includes large-sized terminals (e.g., maritime terminals, aeronautical terminals, etc.). In one example, the user terminal 108 is mobile (e.g., capable of changing location). In another example, the user terminal 108 is stationary (e.g., at a fixed location).

In an exemplary embodiment, the user terminal 108 includes a user terminal-antenna system 134 configured to receive RF signals from one or more of the relay platforms 110 (e.g., over the RTU link 114) (FIG. 1) and transmit RF signals to one or more of the relay platforms 110 (e.g., over the UTR link 116). While not explicitly illustrated, the user terminal-antenna system 134 includes one or more user terminal-antenna, a user terminal-transmitter, a user terminal-receiver and a user terminal-controller. In one example, the user terminal-antenna system 134 includes a separate transmit antenna (e.g., one or more antenna elements configured to transmit) and receive antenna (e.g., one or more antenna elements configured to receive). In another example, the user terminal-antenna system 134 includes a combined transmit/receive antenna (e.g., one or more antenna elements configured to transmit and receive).

The present disclosure recognizes and takes into account that as the number of mobile user terminals increases, the need for non-interfering spectrum sharing in a mobile environment also increases. Accordingly, the disclosed wireless communications system 100 and, more particularly, an adaptable diamond phased array antenna system, generally referred to as an antenna system, 200 of the wireless communications system 100 reduce side lobe interference along the UTR link 116 (e.g., side lobe interference between adjacent relay platforms 110 and/or adjacent user terminals 108).

Thus, in an exemplary embodiment, the disclosed antenna system 200 defines a portion of the RF equipment of the disclosed communications system 100 (FIGS. 1 and 2) and, more particularly, is utilized as (e.g., is an example of) the user terminal-antenna system 134 (FIGS. 3 and 4) for transmitting data from the user terminal 108 to the relay platform 110 over the UTR link 116 (FIGS. 2-4) and/or receiving data from the relay platform 110 over the RTU link 114 (FIG. 1).

Figure 5:
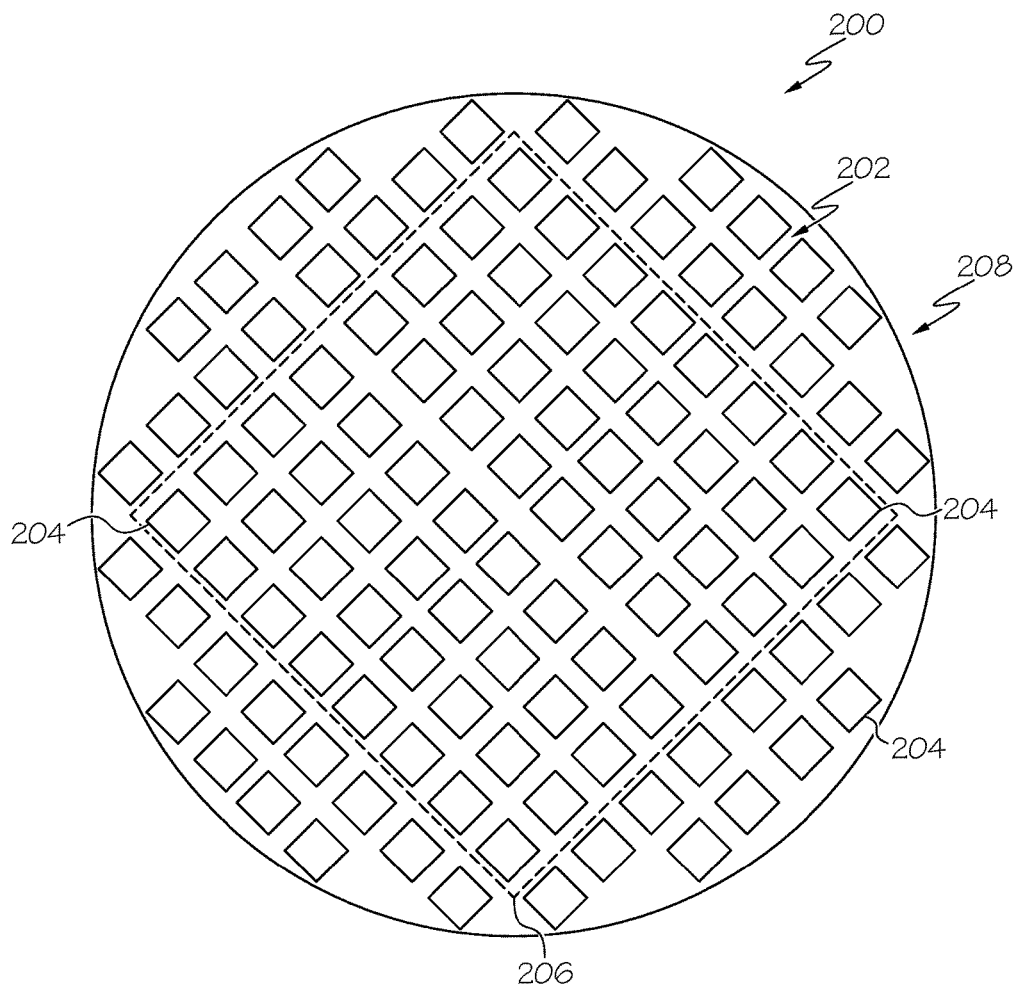
FIG. 5 is a schematic diagram of one embodiment of an array of radiating elements of the disclosed antenna system.

Referring to FIG. 5, and with reference to FIGS. 3 and 4, one embodiment of the disclosed antenna system 200 includes a planar array 202 of a plurality of radiating (e.g., antenna) elements 204 (only three of the radiating elements 204 are explicitly identified in FIG. 5). In one example, the radiating elements 204 are populated in (e.g., arranged as) a planar circle (e.g., the array 202 is a circular planar array 208). As one specific, non-limiting example, the array 202 (e.g., the circular planar array 208) includes 1,412 radiating elements 204 arranged in generally circular shape having a diameter of approximately 34 inches (86 cm). In another example, the radiating elements 204 are populated in (e.g., arranged as) a planar hexagon (e.g., the array 202 is a hexagonal planar array). In yet other examples, the radiating elements 204 are populated in a planar non-circle (e.g., an octagon, etc.) having other geometric shapes (e.g., the array 202 is a non-circular planar array).

At any given time during communication with the relay platform 110 (FIGS. 3 and 4), individual ones or a select plurality of radiating elements 204 are energized (e.g., turned ON) to generate and transmit an RF signal to the relay platform 110 and individual other ones or a select different plurality of radiating elements 204 are de-energized (e.g., turned OFF). The select radiating elements 204 that are energized (e.g., energized radiating elements 204a) (FIG. 10) define or form a diamond shape 206. In other words, the selected ones of the radiating elements 204 that are active form a diamond pattern or a virtual diamond planar array. Accordingly, throughout the present disclosure the terms diamond shape, diamond pattern, virtual diamond planar array may be used interchangeably.

Figure 10:
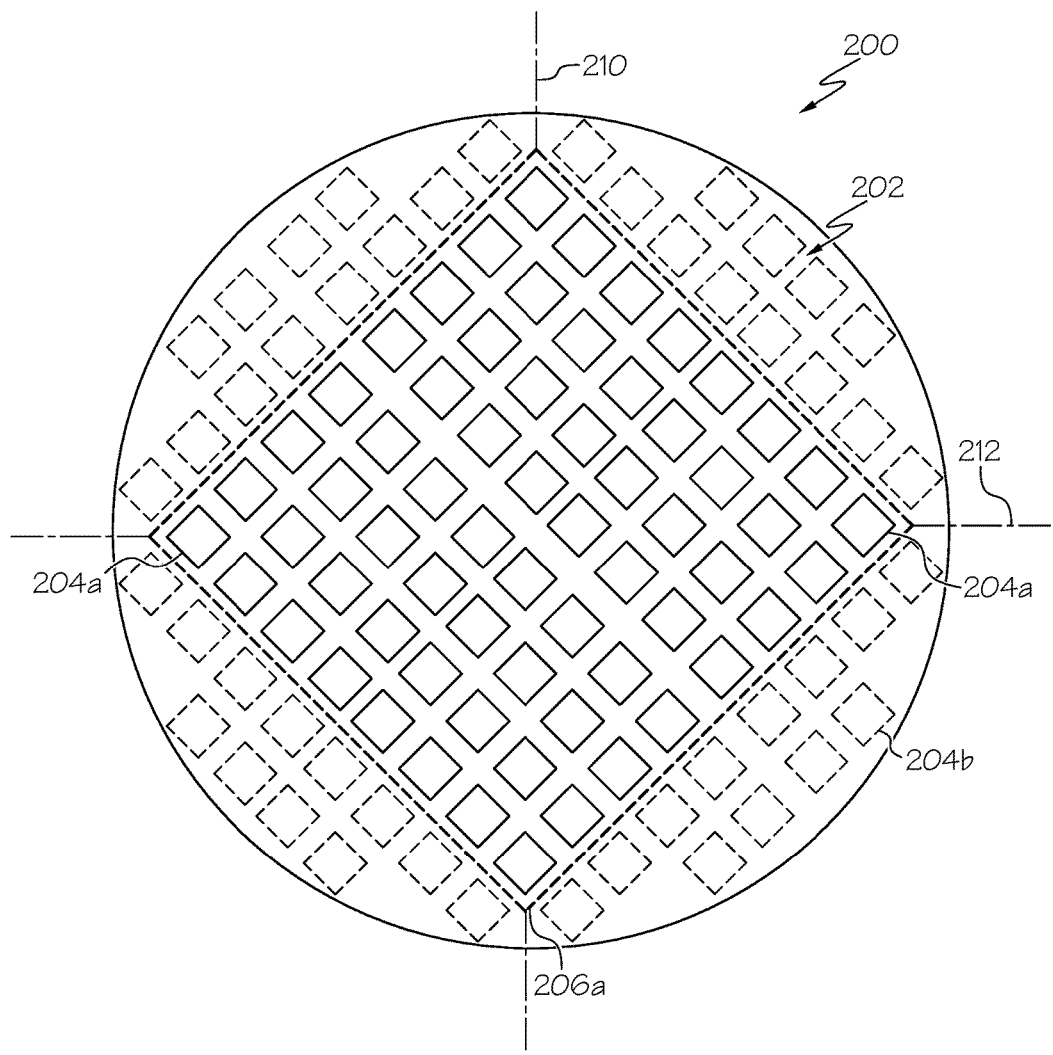
FIG. 10 is a schematic diagram of the radiating elements of FIG. 5 selectively energized to form the diamond shape oriented to align the first axis with the reference plane of FIG. 8.

As used herein, the term energized means that the associate radiating element 204 is being energized by RF radiation or by an electrical signal (e.g., is an energized radiating element 204a) (FIG. 10). Throughout the present disclosure, terms such as illuminated, activated, energize, illuminate, active, activate and similar terms may also be used to identify the energized radiating element 204a. Similarly, as used herein, the term de-energized means that the associate radiating element 204 is not being energized by RF radiation or by an electrical signal (e.g., is a de-energized radiating element 204b) (FIG. 10). Throughout the present disclosure, terms such as non-illuminated, deactivated, de-energize, non-energized, non-energize, non-illuminate, inactive, deactivate and similar terms may also be used to identify the de-energized radiating element 204b.

Figure 6:
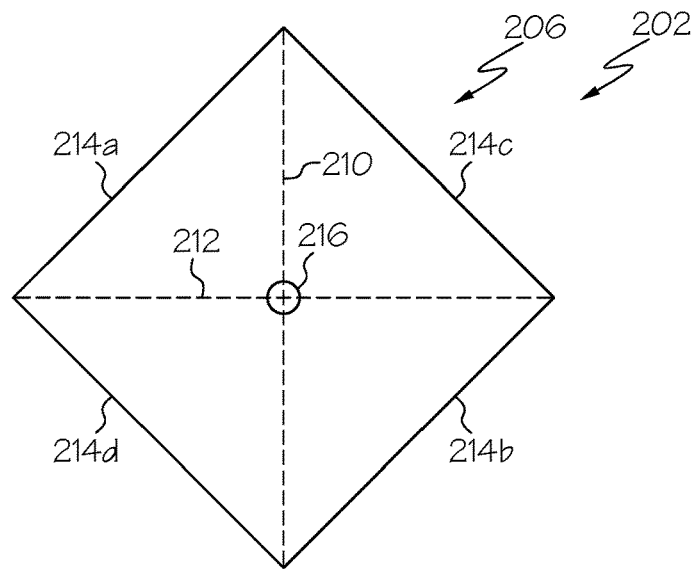
FIG. 6 is a schematic illustration of one embodiment of a diamond shape formed by the radiating elements.
Figure 7:
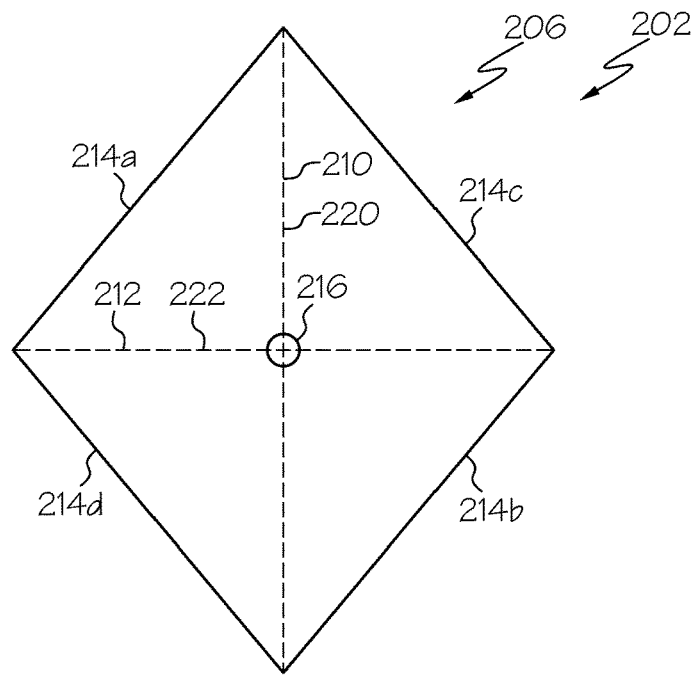
FIG. 7 is a schematic illustration of another embodiment of the diamond shape formed by the radiating elements.

Referring briefly to FIGS. 6 and 7, and with reference to FIGS. 5 and 10-13, as used herein, the term diamond generally refers to a quadrilateral with two pairs of parallel sides, wherein opposite sides are of equal length and opposed angles are equal. The diamond shape 206, for example, formed by the select plurality of active radiating elements 204 of the circular planar array 208 (FIGS. 5, 10 and 11) or the plurality of active radiating elements 204 of a diamond planar array 218 (FIGS. 12 and 13), includes four sides 214 (identified individually as a first side 214a, a second side 214b, a third side 214c and a fourth side 214d). The first side 214a and the second side 214b are opposite one another, the third side 214c and the fourth side 214d are opposite one another and all four sides 214 have an equal length. The diamond shape 206 also includes a first axis 210 extending through a pair of opposed corners and a second axis 212 extending through another pair of opposed corners. The first axis 210 and the second axis 212 perpendicularly bisect one another at a center 216 of the diamond shape 206. The first axis 210 and the second axis 212 may also be referred to as a diagonal, a diagonal axis or a cross axis.

In one embodiment, and as illustrated in FIG. 6, the first axis 210 and the second axis 212 have an equal length. As such, in this embodiment, the term diamond refers to a square, wherein all four sides 214 are of equal length and all four of the corner angles are right angles.

In one embodiment, and as illustrated in FIG. 7, the first axis 210 and the second axis 212 have different lengths. In embodiments where the first axis 210 and the second axis 212 have different lengths, the first axis 210 is also referred to as a long axis 220 and the second axis 212 is referred to as a short axis 222. As such, in this embodiment, the term diamond refers to a rhombus, wherein all four sides 214 are of equal length and opposed corner angles are equal.

Figure 8:
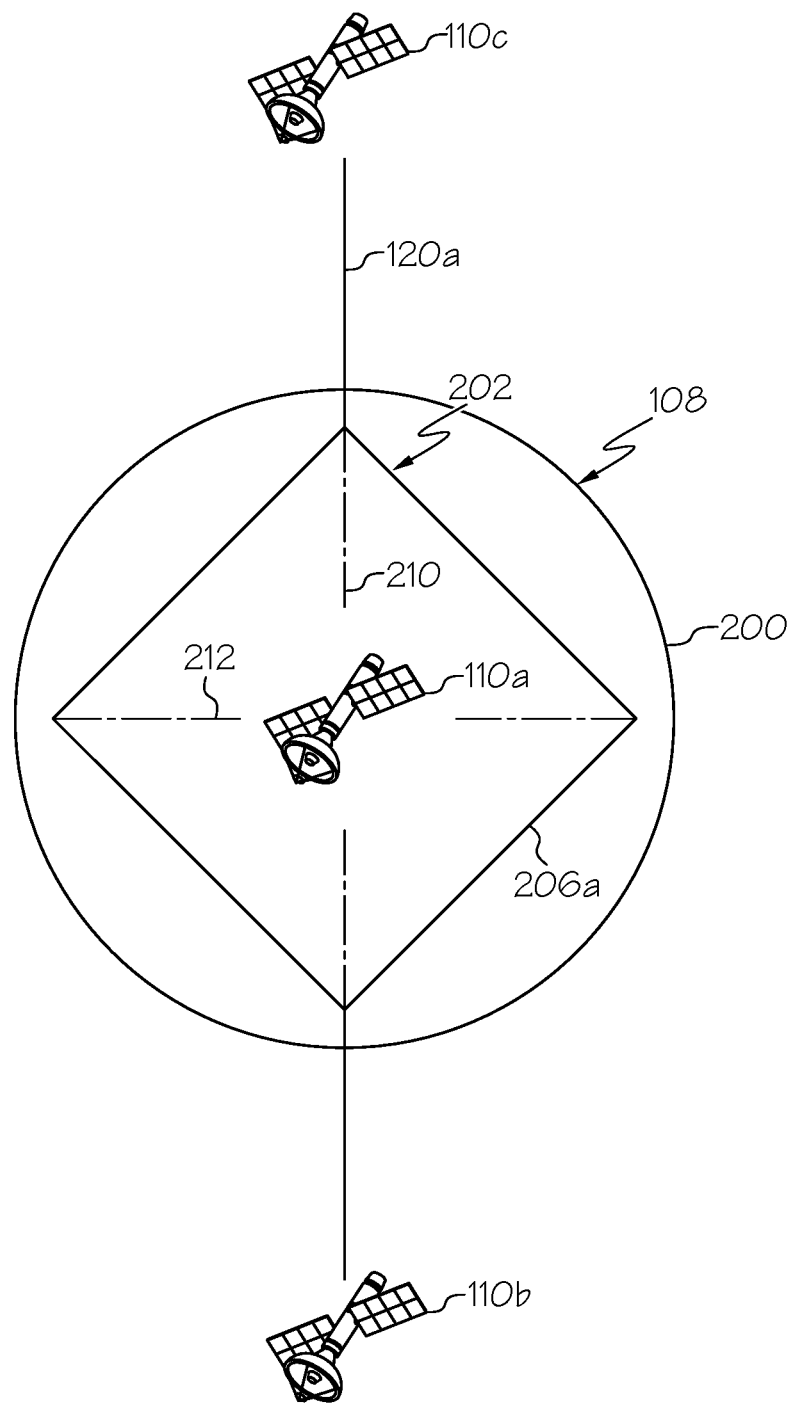
FIG. 8 is a schematic illustration of one embodiment of the diamond shape of the array oriented to align a first axis with a reference plane.
Figure 9:
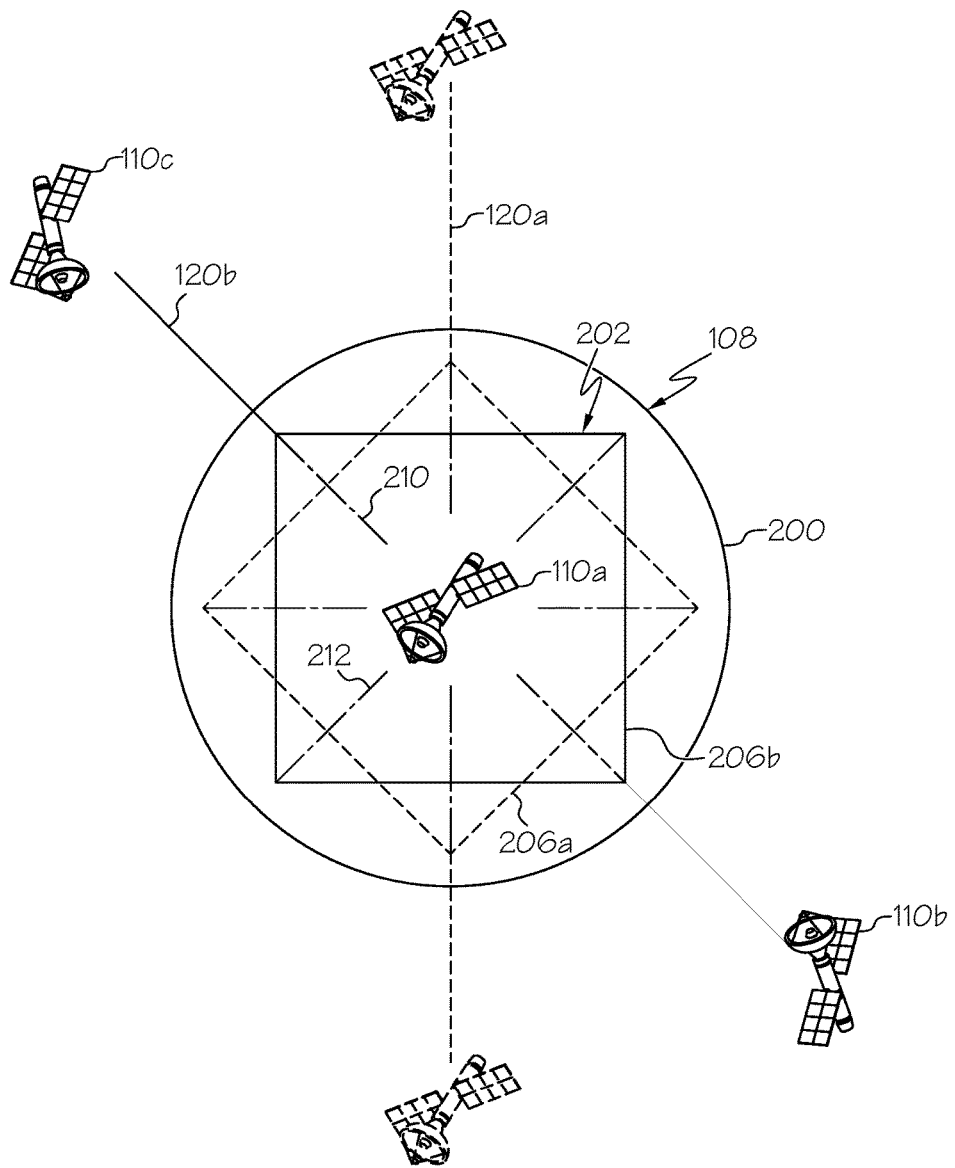
FIG. 9 is a schematic illustration of one embodiment of the diamond shape of the array reoriented to align the first axis with another reference plane.
Figure 18:
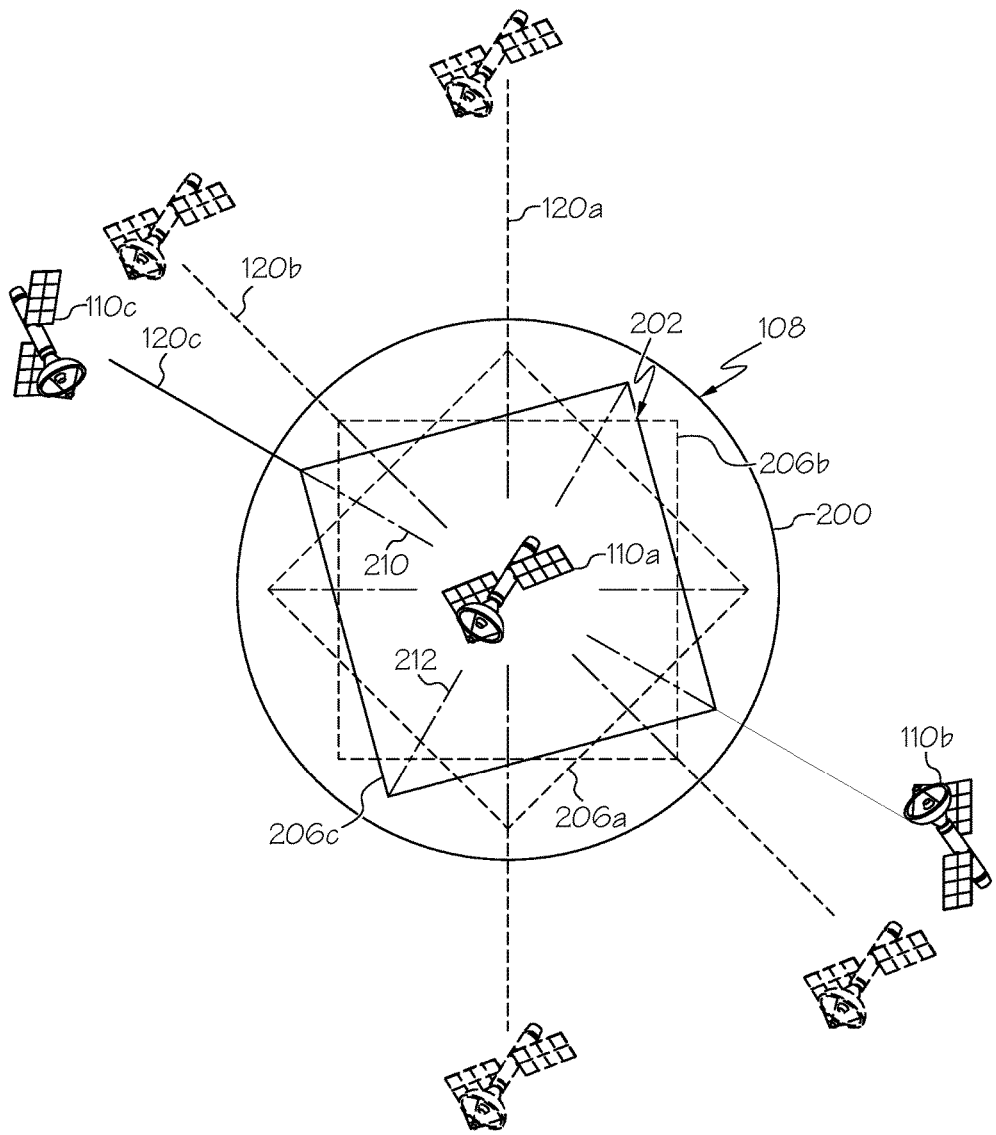
FIG. 18 is a schematic illustration of one embodiment of the diamond shape of the array reoriented to align the first axis with yet another reference plane.

Referring to FIGS. 8, 9 and 18, and with reference to FIGS. 3 and 4, in one embodiment, the antenna system 200 is configured to orient the diamond shape 206 formed by the select radiating elements 204 (FIG. 5) of the array 202 such that the first axis 210 is aligned with the plane 120 of the plurality of relay platforms 110 (FIGS. 1 and 2). The antenna system 200 is further configured to reorient the diamond shape 206 formed by the select radiating elements 204 (FIG. 5) of the array 202 such that the first axis 210 is remains aligned with the plane 120 of the plurality of relay platforms 110 (FIGS. 1 and 2) in response to a change the relative position of the plane 120. In other words, the antenna system 200 is further configured to adapt to a change in a position of the user terminal 108 relative to a position of one or more of the relay platforms 110, a change in the position of the relay platforms 110 relative to the position of the user terminals 108 or a combination thereof.

FIG. 8 illustrates a first configuration or orientation of a first diamond shape 206a aligned with a first plane 120a corresponding to first relative positions of the user terminal 108 and the relay platforms 110. FIG. 9 illustrates a second configuration or orientation of a second diamond shape 206b aligned with a second plane 120a corresponding to second relative positions of the user terminal 108 and the relay platforms (e.g., a change in the relative position of the plane 120). In FIG. 9, the first configuration or orientation of the first diamond shape 206a aligned with the first plane 120a is shown by broken lines. FIG. 18 illustrates a third configuration or orientation of a third diamond shape 206c aligned with a third plane 120c corresponding to third relative positions of the user terminal 108 and the relay platforms (e.g., another change in the relative position of the plane 120). In FIG. 18, the first configuration or orientation of the first diamond shape 206a aligned with the first plane 120a and the second configuration or orientation of the second diamond shape 206b aligned with the second plane 120b are shown by broken lines.

As will be described in more detail herein, in one embodiment, orientation and reorientation of the diamond shape 206 formed by the select radiating elements 204 of the array 202 is performed electronically. In another embodiment, orientation and reorientation of the diamond shape 206 formed by the select radiating elements 204 of the array 202 is performed mechanically. In another embodiment, orientation and reorientation of the diamond shape 206 formed by the select radiating elements 204 of the array 202 is performed electronically and mechanically.

Referring to FIG. 8, and with reference to FIGS. 1, 2 and 5-7, in one embodiment, the antenna system 200 orients the first diamond shape 206 formed by the select radiating elements 204 of the array 202 such that the first axis 210 is aligned with the first plane 120 of the plurality of relay platforms 110. In other words, during wireless communication from the antenna system 200 to one of the relay platforms 110 (e.g., the first relay platform 110a), the orientation of the diamond shape 206 formed by the active radiating elements 204 configured or oriented such that the diagonal (e.g., the first axis 210) of the diamond shape 206 points toward adjacent ones of the relay platforms 110 (e.g., the second relay platform 110b and the third relay platform 110c).

Referring to FIG. 9, and with reference to FIGS. 1, 2 and 5-8, in this embodiment, the antenna system 200 orients the second diamond shape 206b formed by the select radiating elements 204 of the array 202 such that the first axis 210 remains aligned with (e.g., matches or follows) the second plane 120b of the plurality of relay platforms 110 (e.g., reorients or reconfigures the first diamond shape 206a into the second diamond shape 206b). In other words, during wireless communication from the antenna system 200 to one of the relay platforms 110 (e.g., the first relay platform 110a), the relative positions of the user terminal 108 and one or more of the relay platforms 110 may change (e.g., due to movement of the user terminal 108, movement of one or more of the relay platforms 110 or a combination thereof). In response to such a change in relative position, the orientation of the diamond shape 206 formed by the active radiating elements 204 is reconfigured or reoriented such that the diagonal (e.g., the first axis 210) of the diamond shape 206 continues to point toward the adjacent ones of the relay platforms 110 (e.g., the second relay platform 110b and the third relay platform 110c).

Referring to FIG. 18, and with reference to FIGS. 1, 2 and 5-9, in this embodiment, the antenna system 200 orients the third diamond shape 206c formed by the select radiating elements 204 of the array 202 such that the first axis 210 remains aligned with (e.g., matches or follows) the third plane 120b of the plurality of relay platforms 110 (e.g., reorients or reconfigures the second diamond shape 206b into the third diamond shape 206c). In other words, during wireless communication from the antenna system 200 to one of the relay platforms 110 (e.g., the first relay platform 110a), the relative positions of the user terminal 108 and one or more of the relay platforms 110 may further change (e.g., due to further movement of the user terminal 108, further movement of one or more of the relay platforms 110 or a combination thereof). In response to such a change in relative position, the orientation of the diamond shape 206 formed by the active radiating elements 204 is reconfigured or reoriented such that the diagonal (e.g., the first axis 210) of the diamond shape 206 continues to point toward the adjacent ones of the relay platforms 110 (e.g., the second relay platform 110b and the third relay platform 110c).

Referring to FIGS. 8, 9 and 18, generally, in one example, the change in relative position of the plane 120 can be expressed or understood by a rotational movement of the plane 120 about the first relay platform 110a. In one example, reorientation or reconfiguration of the diamond shape 206 can similarly be expressed by or understood by a rotational movement of the diamond shape 206 (or the first axis 210 and second axis 212) about the center 216 of the array 202.

While only three different orientations or configurations of the diamond shape 206 formed by the array 202 of radiating elements 204 are shown by example in FIGS. 8, 9 and 18, any number of other orientations or configurations are also possible.

Further, while the example implementation of the antenna system 200 depicted in FIGS. 8, 9 and 18 illustrate the diamond shape 206 including the first axis 210 and the second axis 212 having an equal length (e.g., FIG. 6), in another example implementation of the antenna system 200, the diamond shape 206 includes the first axis 210 and the second axis 212 having different lengths (e.g., FIG. 7). Generally, when the diamond shape 206 includes the first axis 210 and the second axis 212 having different lengths, the first axis 210 (e.g., the long axis 220) (FIG. 7) is the diagonal axis that is aligned with and remains aligned with the plane 120.

Further still, while the example implementation of the antenna system 200 depicted in FIGS. 8, 9 and 18 illustrate the diamond shape 206 including the first axis 210 and the second axis 212 having the same lengths at each different orientation, in another example implementation, at least one of the first axis 210 and/or the second axis 212 changes between different orientations of the diamond shape 206.

Still further, while the example implementation of the antenna system 200 depicted in FIGS. 8, 9 and 18 illustrate that the relay platforms 110 are satellites 126 (e.g., FIG. 3), in another example implementation of the antenna system 200, the relay platforms 110 are aerial vehicles 130 (e.g., FIG. 4).

Figure 11:
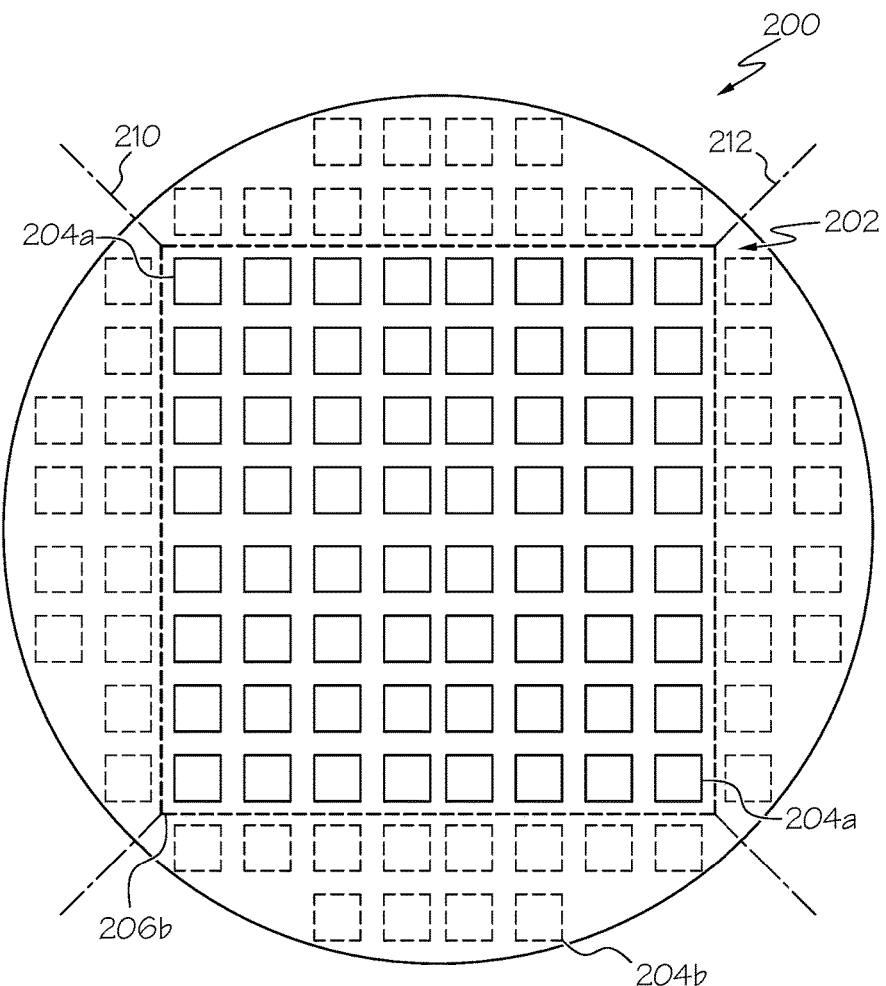
FIG. 11 is a schematic diagram of the radiating elements of FIG. 5 selectively energized to form the diamond shape oriented to align the first axis with the other reference plane of FIG. 9.

Referring to FIGS. 10 and 11, and with reference to FIGS. 5, 8 and 9, in one embodiment, the antenna system 200 electronically configures or orients the diamond shape 206 formed by the select radiating element 204 of the array 202 such that the first axis 210 is aligned with and remains aligned with the plane 120 of the plurality of relay platforms 110. In this embodiment, the antenna system 200 forms the diamond shape 206 of radiating elements 204 by energizing certain ones of the radiating elements 204 (identified herein as the energized radiating elements 204a) and de-energizing certain other ones of the radiating elements 204 (identified herein as the de-energized radiating elements 204a). Thus, in this embodiment, the select radiating elements that define, configured or form the diamond shape 206 are the plurality of energized radiating elements 204a. The energized radiating elements 204a may also be referred to as active elements or illuminated elements and the de-energized radiating elements 204b may also be referred to as inactive elements or non-illuminated elements.

In accordance with the example implementation shown in FIGS. 8, 9 and 18, FIG. 10 illustrates one example of a first plurality of the energized radiating elements 204a (e.g., a first plurality of select radiating elements 204) forming the first diamond shape 206a at a first electronic orientation, such that the first axis 210 is aligned with the first reference plane 120a of the relay platforms 110, when the user terminal 108 and the relay platforms 110 are at a first relative position (e.g., with the relay platforms 110 being within or sharing the common first reference plane 120a), as shown in FIG. 8. Similarly, FIG. 11 illustrates one example of a second plurality of the energized radiating elements 204a (e.g., a second plurality of select radiating elements 204) forming a second diamond shape 206b at a second electronic orientation, such that the first axis 210 is aligned with a second reference plane 120b of the relay platforms 110 (e.g., remains aligned with the reference plane 120 as the relative position of the reference plane 120 changes), when the user terminal 108 and the relay platforms 110 are at a second relative position (with the relay platforms 110 being within or sharing the common second reference plane 120b), as shown in FIG. 9. In other words, the diamond shape 206 rotates about its center 216 to transition from the first diamond shape 206a to the second diamond shape 206b and to change the orientation or alignment of the first axis 210 to correspond to a change in the reference plane 120 (e.g., from the first plane 120a to the second plane 120b) relative to the antenna system 200, for example, due to at least one of a change in the position of the relay platforms 110 (e.g., a change in the path 122) and/or a change in the position of the antenna system 200 (e.g., due to movement of the mobile user terminal 108).

Thus, by selectively energizing and de-energizing different ones of the plurality of radiating elements 204, the antenna system 200 essentially rotates the diamond shape 206 about its center 216 (FIGS. 6 and 7) such that the diagonal (e.g., the first axis 210) (FIGS. 6-9) maintains alignment with (e.g., follows) the plane 120 of the relay platforms 110 (FIGS. 1, 2, 8 and 9).

The manner in which the change in the configuration or orientation of the diamond shape 206 is performed may depend on a variety of factors, such as the magnitude or the speed of the change in the relative position of the plane 120. In one example, the diamond shape 206 is rotated in s stepwise manner by energizing and de-energizing discrete ones of the radiating elements 204, for example, representing a relatively small change in the relative position of the plane 120. In another example, the diamond shape 206 is completely reconfigured by energizing and de-energizing a large number of the radiating elements 204, for example, representing a relatively large change in the relative position of the plane 120.

Figure 12:
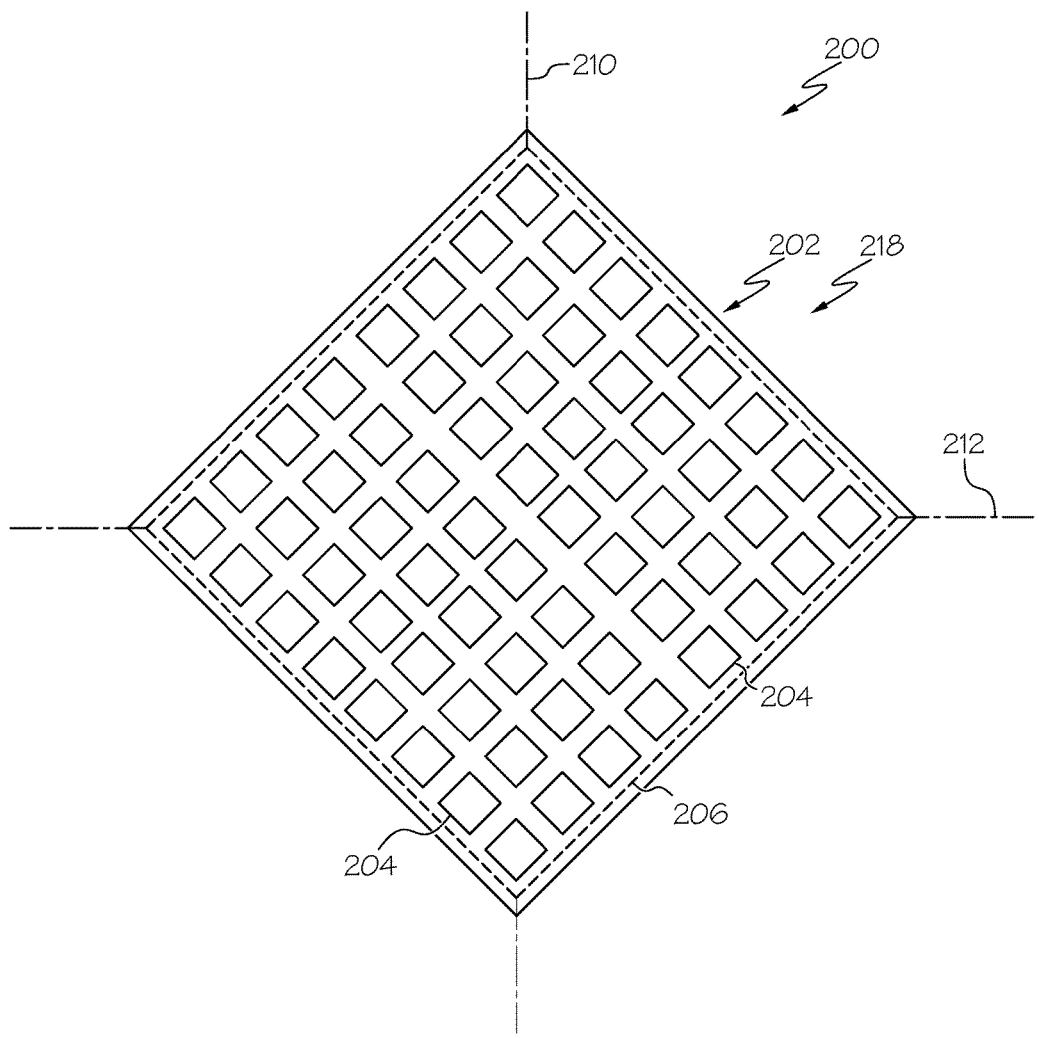
FIG. 12 is a schematic diagram of another embodiment of the array of radiating elements oriented to align the first axis with the reference plane of FIG. 8.

Referring to FIG. 12, and with reference to FIGS. 3 and 4, another embodiment of the disclosed antenna system 200 includes the planar array 202 of the plurality of radiating elements 204 populated in (e.g., arranged as) a planar diamond (e.g., the array 202 is the diamond planar array 218). As one specific, non-limiting example, the array 202 (e.g., the diamond planar array 218) includes 900 active radiating elements 204 arranged in a diamond shape having dimensions of approximately 24 inches (61 cm) by 24 inches.

In contrast to the embodiment illustrated in FIGS. 5, 10 and 11, in this embodiment of the disclosed antenna system 200, the arrangement of the plurality of radiating elements 204 defines or forms the diamond shape 206. As such, at any given time during communication with the relay platform 110 (FIGS. 3 and 4), all of the radiating elements 204 are energized or illuminated to generate and transmit the RF signal to the relay platform 110 (e.g., all of the radiating elements 204 or energized radiating elements 204a).

Figure 13:
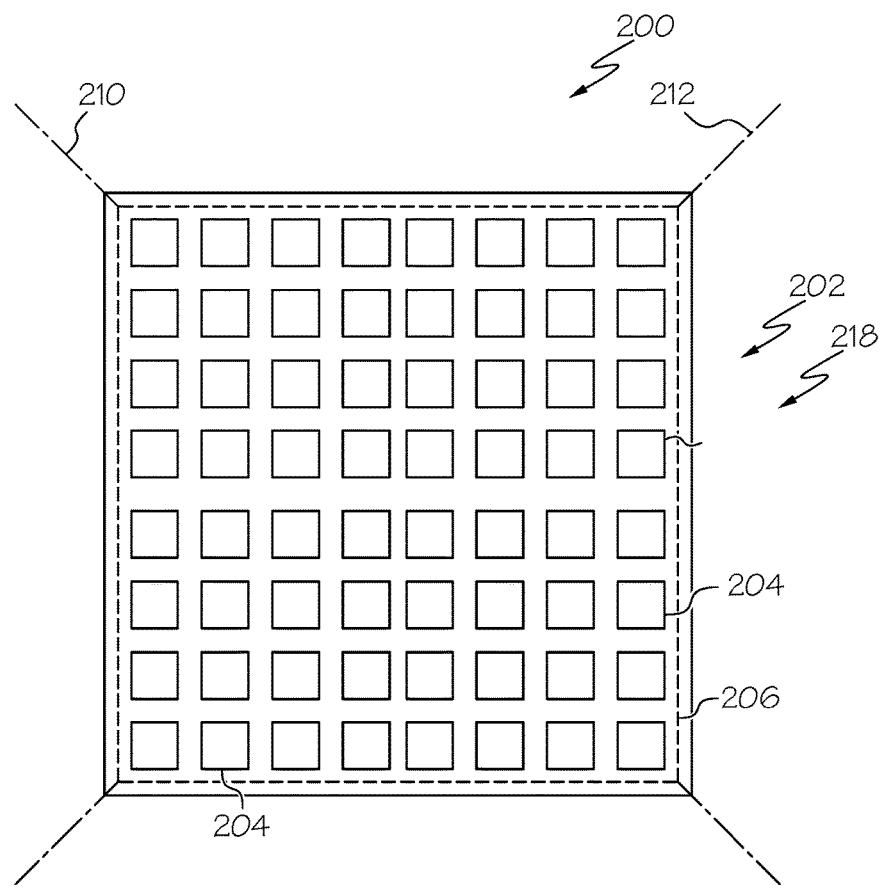
FIG. 13 is a schematic diagram of the array of radiating elements of FIG. 12 oriented to align the first axis with the reference plane of FIG. 8.

Referring to FIGS. 12 and 13, and with reference to FIGS. 1, 2 and 6-8, in one embodiment, the antenna system 200 is configured to mechanically orient the diamond shape 206 formed by the plurality of radiating elements 204 of the array 202 such that the first axis 210 is aligned with the plane 120 of the relay platforms 110. In other words, during wireless communication from the antenna system 200 to one of the relay platforms 110 (e.g., the first relay platform 110a), the diamond shape 206 formed by the radiating elements 204 is oriented such that the diagonal (e.g., the first axis 210) of the diamond shape 206 points toward adjacent ones of the relay platforms 110 (e.g., the second relay platform 110b and the third relay platform 110c).

The antenna system 200 is configured to adapt to a change in the position of the user terminal 108 relative to the position of one or more of the relay platforms 110 or a change in the position of the relay platforms 110 relative to the position of the user terminal 108 (e.g., due to movement of the user terminal 108, movement of one or more of the relay platforms 110 or a combination thereof).

In this embodiment, the antenna system 200 is also configured to mechanically reorient the diamond shape 206 formed by the radiating elements 204 such that the first axis 210 remains aligned with (e.g., follows) the plane 120 of the plurality of relay platforms 110 (also see FIGS. 1 and 2). In other words, during wireless communication from the antenna system 200 to one of the relay platforms 110 (e.g., the first relay platform 110a), the relative positions of the user terminal 108 and one or more of the relay platforms 110 may change. In response to such a change in relative position, the orientation of the diamond shape 206 formed by the radiating elements 204 is mechanically reconfigured such that the diagonal (e.g., the first axis 210) of the diamond shape 206 continues to point toward the adjacent ones of the relay platforms 110 (e.g., the second relay platform 110b and the third relay platform 110c).

In accordance with the example implementation shown in FIGS. 8, 9 and 18, FIG. 12 illustrates one example of the plurality of radiating elements 204 forming the diamond shape 206 at a first mechanical orientation, such that the first axis 210 is aligned with the first plane 120a of the relay platforms 110, when the user terminal 108 and the relay platforms 110 are at the first relative position, as shown in FIG. 8. Similarly, FIG. 13 illustrates one example of the plurality of radiating elements 204 forming the diamond shape 206 at a second mechanical orientation, such that the first axis 210 remains aligned with the second plane 120 of the relay platforms 110 (e.g., remains aligned with the reference plane 120 as the relative position of the reference plane 120 changes), when the user terminal 108 and the relay platforms 110 are at the second relative position, as shown in FIG. 9.

In yet another embodiment, the disclosed antenna system 200 includes characteristics of both of the previously described embodiments. As one example, the antenna system 200 is configured to both electronically and mechanically orient the diamond shape 206 formed by a select plurality of energized radiating elements 204a of the array 202 such that the first axis 210 is aligned with the plane 120 of the relay platforms 110 and is also configured to electronically and mechanically reorient the diamond shape 206 formed by the selected plurality of energized radiating elements 204a such that the first axis 210 remains aligned with (e.g., follows) the plane 120 of the plurality of relay platforms 110.

Figure 14:
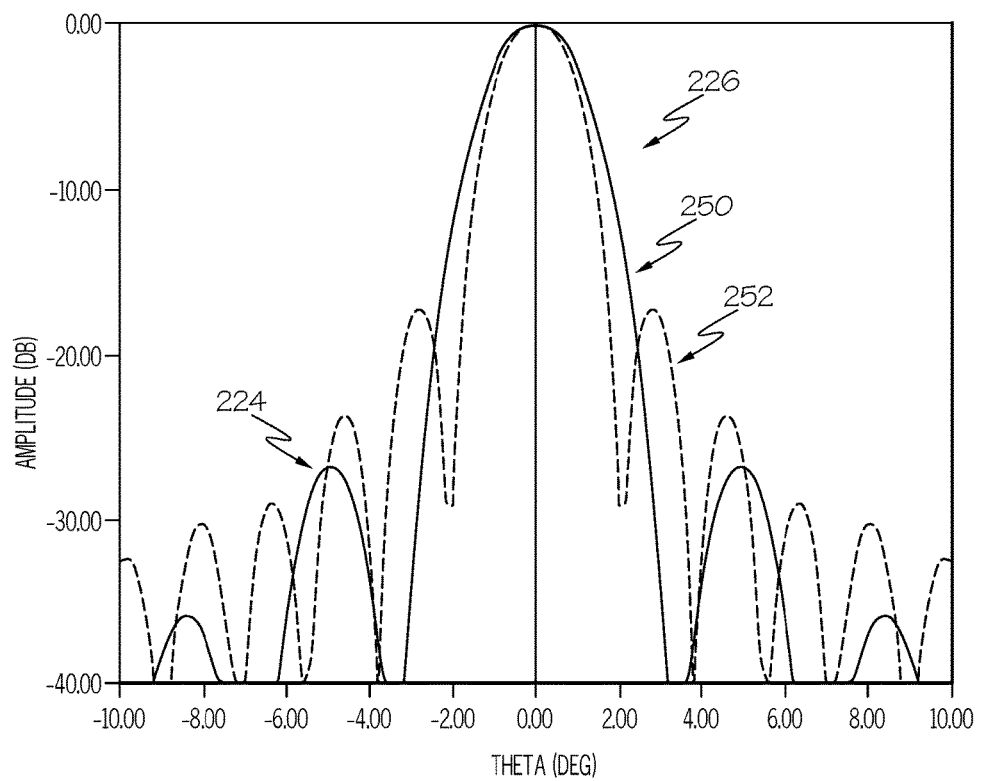
FIG. 14 is a comparison graph of radiation patterns.

FIG. 14 illustrates the radiation pattern 250 of the disclosed antenna system 200 including the array 202 having illuminated radiating elements 204 forming the diamond shape 206 as compared to the radiation pattern 252 of a traditional circular planar array having illuminated radiating elements forming a circular shape. The radiation patterns illustrated in FIG. 13 are along the diagonal plane (e.g., along the plane 120 of the relay platforms 110). The horizon corresponds to a 0-degree angle, with angles below the horizon being positive. The radiation patterns of FIG. 14 are symmetrical and show peak amplitudes (e.g., level) of the main lobes 226 and peak amplitudes of the side lobe 224.

As illustrated, the diamond shape 206 formed by the illuminated radiating elements 204 of the array 202 (e.g., either by the energized radiating elements 204a of the circular planar array 208 or the radiating elements 204 of the diamond planar array 218) being oriented with the diagonal (e.g., the first axis 210) aligned with the plane 120 corresponding to the path 122 of the relay platforms 110 can achieve a reduction in the amplitude of the side lobes 224 along the plane 120 of approximately 10 decibels (dB). Thus, the disclosed antenna system 200 results in an improvement in side lobe interference along the diagonal direction (e.g., along the first axis 210).

Without being limited to any particular theory, the radiation pattern 250 of the disclosed antenna system 200 is defined by a cardinal sine function or sinc function. As one example, the radiation pattern 250 is described by an (x, y) sinc function defined as $Sinc(x)*Sinc(y)$, wherein (x) is the first axis 210 and (y) is the second axis 212.

The radiation pattern 250 illustrated in FIG. 14 represents a diamond shape 206 of radiating elements 204 including the first axis 210 and the second axis 212 having equal lengths. Those skilled in the art will appreciate that the radiation pattern 250 will change as the lengths of the first axis 210 and the second axis 212 change relative to each other. Generally, the longer the diagonal axis, the better suppression of side lobes interference is achieved along that axis and the sharper the main lobe is along that axis.

Figure 15:
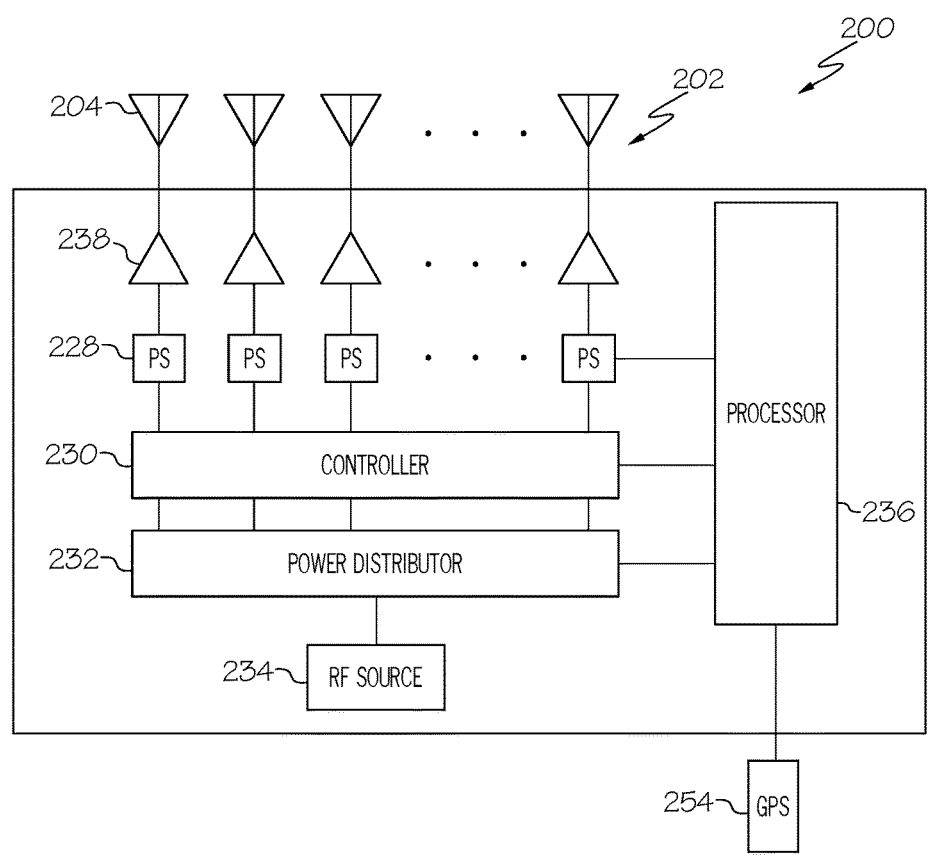
FIG. 15 is a schematic block diagram of one embodiment of the disclosed antenna system.
Figure 16:
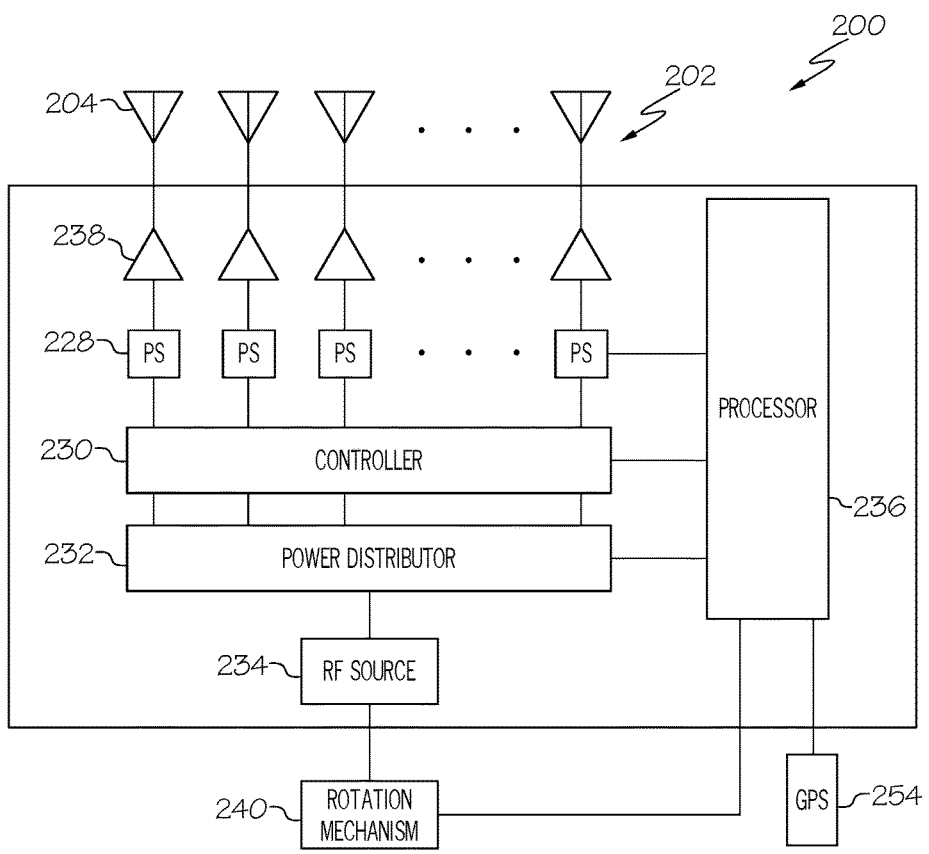
FIG. 16 is a schematic block diagram of another embodiment of the disclosed antenna system.

Referring to FIG. 15, in one embodiment, for example, the embodiment illustrated in FIGS. 5, 10 and 11, the antenna system 200 is a direct radiating array antenna including the array 202 of the plurality of radiating elements 204. One or more of the radiating elements 204 is associated with and connected to an output of one or more phase shifters 228 (a phase shifter module). In FIGS. 15 and 16, "PS" identifies the phase shifter 228. Optionally, the antenna system 200 includes one or more amplifiers 238 associated with and connected to one or more of the radiating elements 204. A controller 230 (a controller module) is configured to control inputs provided to the radiating elements 204 and outputs provided from the radiating elements 204. As one example, the controller 230 controls the RF input provided by an RF source 234 (e.g., an RF transmitter, an RF receiver or a combination thereof). As another example, the controller 230 controls the power input provided by a power distributor 232 (a power distributor module). The controller 230 and/or the phase shifters 228 also apply an appropriate beamweight and make any appropriate beamweight corrections to control the amplitude and the phase of the RF signal transmitted by the radiating elements 204.

The antenna system 200 also includes a suitably programmed computer processor 236 (or a processor module). The processor 236 is configured under program control to implement a sequence of method steps, including a method to electronically orient the diamond shape 206 formed by the select radiating elements 204 (e.g., the energized radiating elements 204) of the array 202 such that the first axis 210 is aligned with the plane 120 of the plurality of relay platforms 110. As one example, the processor 236 controls which selected ones of the plurality of radiating elements 204 are energized and/or de-energized (selects which of the radiating elements 204 are energized radiating elements 204a and de-energized radiating elements 204b). Control of the radiating elements 204 configures the shape and/or size of the diamond shape 206, for example, by defining the lengths of the first axis 210 and the second axis 212. Control of the radiating elements 204 also configures the orientation of the diamond shape 206, for example, by defining the rotational orientation of the first axis 210 and the second axis 212, such that the orientation of the diagonal (e.g., the first axis 210) is aligned with the plane 120 of the relay platforms 110. Control of the radiating elements 204 also reconfigures the orientation of the diamond shape 206 such that the orientation of the diagonal (e.g., the first axis 210) remains aligned with the plane 120 of the relay platforms 110 in response to a change in relative position between the user terminal 108 and one or more of the relay platforms 110. In other words, the processor 236 is configured to control the degree of rotation or the rotational alignment of the diamond shape 206.

For example, the disclosed method 300 (FIG. 17), the method may to electronically orient the diamond shape 206 formed by the select radiating elements 204 and/or portions thereof may be implemented as or utilize a computer program product that includes a non-transitory computer readable memory medium and computer controlling instructions stored on the non-transitory computer readable memory medium that is executed by a computer processor, such as the computer processor 236 of the antenna system 200.

The example system 200 may also include one or more data stores, input devices, output devices, and a network interface. A bus system, including, for example, a data bus and a motherboard, can be used to establish and control data communication between the components of the system 200. Other system architectures can also be used.

The processor 236 may, for example, include one or more microprocessors. The data store may, for example, include a random access memory storage device, such as a dynamic random access memory, one or more hard drives, a flash memory, and/or a read only memory or other types of computer-readable medium memory devices.

Thus, various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Referring again to FIG. 15, and with reference to FIGS. 3 and 4, in one embodiment, the processor 236 is also configured to determine the position and location in space of the user terminal 108. In one example, the processor 236 receives position information for the user terminal 108 from a Global Positioning System (GPS) device 254 (or GPS module). As one example, the GPS device 254 is integrated into the antenna system 200. As another example, the GPS device 254 is integrated into the control system or navigation system of the user terminal 108 (e.g., of the mobile platform or vehicle).

In one embodiment, the processor 236 is also configured to determine the position and location in space of each of the relay platforms 110. Depending upon the type of relay platform 110 (e.g., the satellite 126 or the aerial vehicle 130), the position information for the relay platform 110 may be stored, for example, in memory, and communicated to the processor 236 or may be determined by the processor 236. In one example, the positions of each of the relay platforms 110 at given times (e.g., the ephemeris for the satellites 126 or predetermined flight paths for the aerial vehicles 130) are predetermined and communicated to the processor 236. As one example, the predetermined position information may be preloaded onto memory (e.g., stored onboard the user terminal 108 or the antenna system 200) and communicated to the processor 236. As another example, the predetermined position information may be stored onboard the relay platform 110 and communicated to the processor 236. In one example, the positions of each of the relay platforms 110 at given times are determined or calculated by the processor 236.

Accordingly, the processor 236 is configured to determine the plane 120 based on the position information for the relay platforms 110 and the orientation of the diamond shape 206 based on alignment of the diagonal (e.g., the first axis 210) of the diamond shape 206 with the plane 120.

In one embodiment, the processor 236 is also configured to determine the optimum configuration of the diamond shape 206 formed by energizing the select plurality of radiating elements 204. In one example, the processor 236 is configured to calculate the lengths of the first axis 210 and the second axis 212 of the diamond shape 206 to balance (e.g., optimize) suppression of side lobe interference along the first axis 210 with the suppression of side lobe interference along the second axis 212. The processor 236 is also configured to balance (e.g., optimize) the lengths of the first axis 210 and the second axis 212 of the diamond shape 206 with the overall area formed by the diamond shape 206. Those skilled in the art will appreciate that in RF communications, the larger the area (e.g., the larger the antenna aperture) defined by the energized radiating elements 204a of the array 202, the greater directivity is provided to the RF signal. Thus, the processor 236 is configured to balance side lobe suppression (e.g., based on the lengths of the first axis 210 and the second axis 212) with directivity (e.g., based on the area of the diamond shape 206).

Referring to FIG. 16, in one embodiment, for example, the embodiment illustrated in FIGS. 12 and 13, the antenna system 200 also includes a rotation mechanism 240. The rotation mechanism 240 is configured to mechanically orient the diamond shape 206 formed by the radiating elements 204 of the array 202 such that the first axis 210 is aligned with the plane 120 of the plurality of relay platforms 110. The processor 236 is configured to control the degree of mechanical rotation of the array 202 by the rotation mechanism 240.

Whether the orientation of the diamond shape 206 formed by the array 202 is configured electronically (e.g., by selectively energizing and de-energizing radiating elements 204 of the circular planar array 208 to define the rotational orientation of the diamond shape 206), configured mechanically (e.g., by mechanically rotating the diamond planar array 218 to define the rotational orientation of the diamond shape 206 or a combination thereof, the resolution of the change in orientation may be limited only by the structural limitations of the array 202 (e.g., the number of radiating elements 204) and/or the rotation mechanism.

Figure 17:
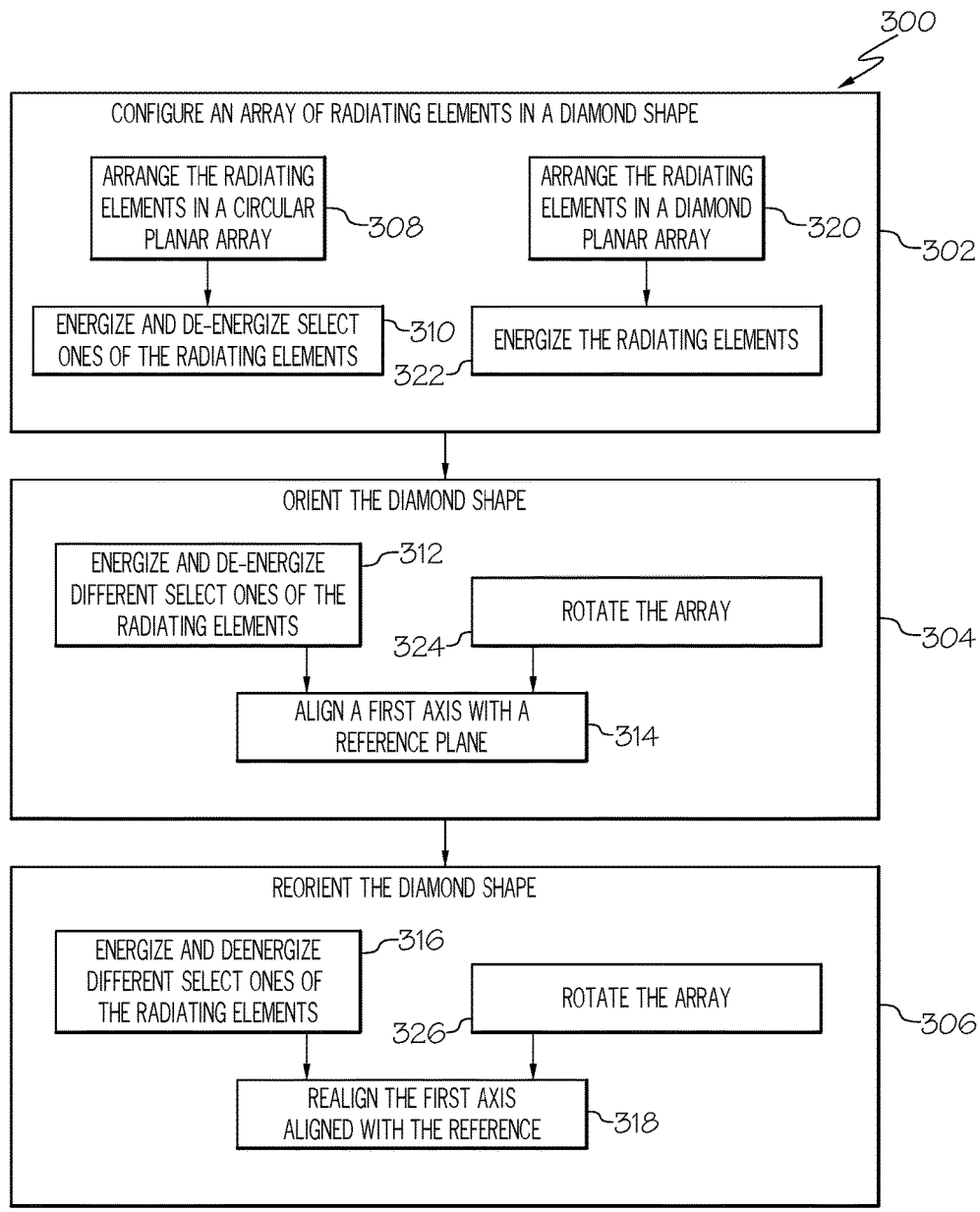
FIG. 17 is a flow diagram of one embodiment of the disclosed communications method.

Referring to FIG. 17, and with reference to FIGS. 1-16, one embodiment of a communications method 300 is disclosed. The method 300 is one example implementation of utilizing the disclosed communications system 100 and antenna system 200 for wireless communications. Modifications, additions, or omissions may be made to method 300 without departing from the scope of the present disclosure. Method 300 may include more, fewer, or other steps. Additionally, steps may be performed in any suitable order.

Referring to FIG. 16, and with reference to FIGS. 3-13, in one embodiment, the method 300 includes the step of configuring the array 202 of radiating elements 204 in the diamond shape 206, as shown at block 302. The diamond shape includes the first axis 210 and the second axis 212. As shown at block 304, the method 300 also includes the step of orienting the diamond shape 206 to align the first axis 210 with the reference plane 120 shared by the plurality of airborne communications relay platforms 110. As shown at block 306, the method 300 also includes the step of reorienting the diamond shape 206 to maintain the first axis 210 aligned with the reference plane 120 in response to a change in position of the reference plane 120 relative to the array 202.

Referring to FIG. 16, and with reference to FIGS. 3-11, in one implementation of the method 300, the step of configuring the array 202 of radiating elements 204 in the diamond shape 206 (block 302) includes the steps of arranging the radiating elements 204 in the circular planar array 208, as shown at block 308, and energizing and de-energizing select ones of the radiating elements 204 (e.g., the energized radiating elements 204a and the de-energized radiating elements 204b) to form the diamond shape 206, as shown at block 310.

In this implementation of the method 300, the step of orienting the diamond shape 206 to align the first axis 210 with the reference plane 120 (block 304) includes the steps of energizing and de-energizing different select ones of the radiating elements 204 to orient the diamond shape 206, as shown at block 312, and aligning the first axis 210 with the reference plane 120, as shown at block 314.

In this implementation of the method 300, the step of reorienting the diamond shape 206 to maintain the first axis 210 aligned with the reference plane 120 (block 306) includes the steps of energizing and de-energizing still different select ones of the radiating elements 204 to reorient the diamond shape 206, as shown at block 316, and realigning the first axis 210 with the reference plane 120, as shown at block 318.

Referring to FIG. 16, and with reference to FIGS. 3, 4, 6-9, 12 and 13, in another implementation of the method 300, the step of configuring the array 202 of radiating elements 204 in the diamond shape 206 (block 302) includes the steps of arranging the radiating elements 204 in the diamond planar array 218, as shown at block 320, and energizing the radiating elements 204 to form the diamond shape 206, as shown at block 322.

In this implementation of the method 300, the step of orienting the diamond shape 206 to align the first axis 210 with the reference plane 120 (block 304) includes the steps of rotating the array 202 to orient the diamond shape 206, as shown at block 324, and aligning the first axis 210 with the reference plane 120, as shown at block 314.

In this implementation of the method 300, the step of reorienting the diamond shape 206 to maintain the first axis 210 aligned with the reference plane 120 (block 306) includes the steps of rotating the array 202 to reorient the diamond shape 206, as shown at block 326, and realigning the first axis 210 with the reference plane 120, as shown at block 318.

During any of the steps of initially configuring the array 202 of radiating elements 204 (block 302), reconfiguring the array 202 to orient the diamond shape 206 to align the first axis 210 with the reference plane 120 (block 304) and/or again reconfiguring the array 202 to reorient the diamond shape 206 to realign (e.g., maintain) the first axis 210 with the reference plane 120 (block 306), the method 300 also includes the steps of determining the positions of the relay platforms and determining the position of the user terminal 108 (and the antenna system 200). Based on this position information, the method 300 also includes the step of defining the relative position of the plane 120. Based on the determined relative position of the plane 120, the method 300 also includes the step of determining the orientation of the diamond shape 206 in order to align the diagonal (e.g., the first axis 210) with the plane 120.

Accordingly, the disclosed antenna system 200, for example, as used with the disclosed communications system 100 and method 300, provides for a dynamically reconfigurable array 202 of radiating elements 204 that can adapt to the mobile environment by reorienting the diamond shape 206 formed by the radiating elements to reduce side lobe interference with adjacent relay platforms 110. Electronic reconfiguration of the diamond shape 206 by selectively energizing and de-energizing different ones of the radiating elements 204 provides for better control of the radiation pattern and more degrees of freedom. The disclosed antenna system 200 reduces, if not eliminates, interference with relay platforms 110 (e.g., the second relay platform 110b and the third relay platform 110c) that are adjacent to the relay platform 110 (e.g., the first relay platform 110a) to which the antenna system 200 is communicating, which improves signal to noise+interference ration (SNIR) performance in the system. Controlling the geometry of the diamond shape 206 formed by the energized radiating elements 204 by maintaining the diagonal (e.g., the first axis 210) of the diamond shape 206 aligned with the reference plane 120 of the plurality of relay platforms 110 maintains the lowest amplitude side lobes directed to the adjacent relay platforms 110 (e.g., the second relay platform 110b and the third relay platform 110c) positioned within the plane 120.

Throughout the disclosure, various components of the disclosed antenna system 200 are described as "modules". For the purpose of the present disclosure, the term module may include hardware, software or a combination of hardware and software. As one example, a module may include a computer having a processor, a storage device (e.g., a memory), an input device and/or a display. The module may also include a computer-readable storage medium having instructions that, when executed by the processor causes the processor to perform or execute the described functions.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Although various embodiments of the disclosed systems and method have been shown and described, modifications may occur to those skilled in the art upon reading the specification. The present application includes such modifications and is limited only by the scope of the claims.

What is claimed is:

1. An antenna system (200) comprising:
  an array (202) of radiating elements (204) forming a diamond shape (206), wherein:
  said diamond shape comprises a first axis (210) and a second axis (212),
  said diamond shape is oriented with said first axis aligned with a reference plane (120) shared by a plurality of airborne communications relay platforms (110), and
  said diamond shape is reoriented to maintain said first axis aligned with said reference plane in response to a change in position of said reference plane relative to said array.

2. The system of claim 1 wherein:
  said array comprises a circular planar array (208),
  said circular planar array comprises energized radiating elements (204a) and de-energized radiating elements (204b), and
  said energized radiating elements form said diamond shape.

3. The system of claim 2 further comprising a processor (236) electronically coupled to said array, wherein:
said processor is configured to electronically orient said diamond shape by energizing and de-energizing select ones of said radiating elements, and
said processor is configured to electronically reorient said diamond shape by energizing and de-energizing select different ones of said radiating elements to rotate said diamond shape about a center (216) of said array.

4. The system of claim 1 wherein:
said array comprises a diamond planar array (218),
said diamond planar array comprises energized radiating elements (204a), and
said energized radiating elements form said diamond shape.

5. The system of claim 4 further comprising a rotation mechanism (240) mechanically coupled to said array, wherein:
said rotation mechanism is configured to mechanically orient said diamond shape, and
said rotation mechanism is configured to mechanically reorient said diamond shape by rotating said array about a center (216) of said array.

6. The system of claim 1 wherein said first axis and said second axis have an equal length.

7. The system of claim 1 wherein said first axis and said second axis have different lengths.

8. A communications system (100) comprising:
a plurality of airborne communications relay platforms (110) travelling along a path (122) within a shared reference plane (120); and
a user terminal (108) in wireless communication with one of said communications relay platforms by an antenna system (200), said antenna system comprising an array (202) of radiating elements (204) forming a diamond shape (206), wherein:
said diamond shape comprises a first axis (210) and a second axis (212),
said diamond shape is oriented with said first axis aligned with said reference plane, and
said diamond shape is reoriented to maintain said first axis aligned with said reference plane in response to a change in position of at least one of said relay platforms relative to said user terminal.

9. The system of claim 8 wherein:
said array comprises a circular planar array (208),
said circular planar array comprises energized radiating elements (204a) and de-energized radiating elements (204b), and
said energized radiating elements form said diamond shape.

10. The system of claim 9 wherein said antenna system further comprises a processor (236) electronically coupled to said array, wherein:
said processor is configured to electronically orient said diamond shape by energizing and de-energizing select ones of said radiating elements, and
said processor is configured to electronically reorient said diamond shape by energizing and de-energizing select different ones of said radiating elements to rotate said diamond shape about a center (216) of said array.

11. The system of claim 8 wherein:
said array comprises a diamond planar array (218),
said diamond planar array comprises energized radiating elements (204a), and
said energized radiating elements form said diamond shape.

12. The system of claim 11 wherein said antenna system 200 further comprises a rotation mechanism (240) mechanically coupled to said array, wherein:
said rotation mechanism is configured to mechanically orient said diamond shape, and
said rotation mechanism is configured to mechanically reorient said diamond shape by rotating said array about a center (216) of said array.

13. The system of claim 8 wherein each of said airborne communications relay platforms comprises a satellite (126), and wherein said reference plane is an orbital plane.

14. The system of claim 8 wherein each of said airborne communications relay platforms comprises a high altitude aerial vehicle (130), and wherein said reference plane is an orbital plane.

15. The system of claim 8 wherein said user terminal is one of a vehicular terminal, an aeronautical terminal and a maritime terminal.

16. A communications method (300) comprising:
configuring (302) an array (202) of radiating elements (204) in a diamond shape (206), said diamond shape comprising a first axis (210) and a second axis (212);
orienting (304) said diamond shape to align said first axis with a reference plane (120) shared by a plurality of airborne communications relay platforms (110); and
reorienting (306) said diamond shape to maintain said first axis aligned with said reference plane in response to a change in position of said reference plane relative to said array.

17. The method of claim 16 further comprising:
arranging (308) said radiating elements in a circular planar array (208);
energizing and de-energizing (310) select ones of said radiating elements to form said diamond shape;
energizing and de-energizing (312) different select ones of said radiating elements to orient said diamond shape; and
aligning (314) said first axis with said reference plane.

18. The method of claim 17 further comprising:
energizing and de-energizing (316) still different select ones of said radiating elements to reorient said diamond shape; and
realigning (318) said first axis with said reference plane.

19. The method of claim 16 further comprising:
arranging (320) said radiating elements in a diamond planar array (218);
energizing (322) said radiating elements to form said diamond shape;
rotating (324) said array to orient said diamond shape; and
aligning (314) said first axis with said reference plane.

20. The method of claim 19 further comprising:
rotating (326) said array to reorient said diamond shape; and
realigning (318) said first axis with said reference plane.

* * * * *